(12) United States Patent
Li

(10) Patent No.: US 12,439,325 B2
(45) Date of Patent: Oct. 7, 2025

(54) COMMUNICATION METHOD AND APPARATUS

(71) Applicant: HUAWEI TECHNOLOGIES CO., LTD., Guangdong (CN)

(72) Inventor: Zhuoming Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

(21) Appl. No.: 17/958,242

(22) Filed: Sep. 30, 2022

(65) Prior Publication Data

US 2023/0026697 A1   Jan. 26, 2023

Related U.S. Application Data

(63) Continuation of application No. PCT/CN2021/075686, filed on Feb. 6, 2021.

(30) Foreign Application Priority Data

Apr. 7, 2020  (CN) .......................... 202010266217.2
May 20, 2020  (CN) .......................... 202010432439.7

(51) Int. Cl.
 *H04W 48/18* (2009.01)
 *H04W 48/14* (2009.01)
 (Continued)

(52) U.S. Cl.
 CPC ........... *H04W 48/14* (2013.01); *H04W 48/18* (2013.01); *H04W 60/00* (2013.01); *H04W 72/56* (2023.01)

(58) Field of Classification Search
 CPC ..... H04W 48/14; H04W 48/18; H04W 60/00; H04W 72/56; H04W 48/08; H04W 48/16; H04W 48/20; H04W 28/24; H04L 45/306
 See application file for complete search history.

(56) References Cited

U.S. PATENT DOCUMENTS

2019/0141606 A1*  5/2019  Qiao .................... H04W 76/18
2022/0287036 A1*  9/2022  Mildh ................... H04W 72/56
(Continued)

FOREIGN PATENT DOCUMENTS

| CN | 108924884 A | 11/2018 |
| CN | 110267327 A |  9/2019 |
| EP |   3537760 A1 |  9/2019 |

OTHER PUBLICATIONS

Huawei,"Allowed slice information from AMF", 3GPP TSG-RAN3 Meeting #99 R3-181099, Athens, Greece, Feb. 26-Mar. 2, 2018, Total 4 Pages.

(Continued)

*Primary Examiner* — Marcus Hammonds
(74) *Attorney, Agent, or Firm* — WOMBLE BOND DICKINSON (US) LLP

(57) ABSTRACT

This application discloses a communication method and apparatus. A first AMF device receives a first request message, where the first request message includes an identifier of a first network slice that a terminal requests to access and an identifier of a tracking area in which the terminal is located. When the first AMF device determines that the tracking area supports the first network slice, the first AMF device sends a response message, where the response message includes a first radio access selection priority index corresponding to the first network slice. The first radio access selection priority index is for selection of an access network device that supports the first network slice at the terminal. Even if an access network device currently accessed by the terminal does not support the first network slice, the terminal may re-access the access network device that supports the first network slice.

20 Claims, 8 Drawing Sheets

(51) Int. Cl.
*H04W 60/00* (2009.01)
*H04W 72/56* (2023.01)

(56) References Cited

U.S. PATENT DOCUMENTS

| | | | | |
|---|---|---|---|---|
| 2022/0360996 A1* | 11/2022 | Luo | ..................... | H04W 36/13 |
| 2023/0052699 A1* | 2/2023 | Ninglekhu | ............ | H04W 60/04 |
| 2023/0108950 A1* | 4/2023 | Centonza | .............. | H04W 36/14 370/331 |

OTHER PUBLICATIONS

3GPP TS 23.501 V16.4.0 (Mar. 2020), 3rd Generation Partnership Project; Technical Specification Group Services and System Aspects; System architecture for the 5G System (5GS);Stage 2(Release 16), 430 pages.

3GPP TS 23.502 V16.4.0 (Mar. 2020), 3rd Generation Partnership Project; Technical Specification Group Services and System Aspects; Procedures for the 5G System (5GS); Stage 2(Release 16), 582 pages.

3GPP TS 23.503 V16.4.1:"3rd Generation Partnership Project;Technical Specification Group Services and System Aspects;Policy and charging control framework for the5G System (5GS);Stage 2(Release 16)",Apr. 2020,total 115 pages.

3GPP, "Technical Specification Group Services and System Aspects Study on enhancement of network slicing Phase 2(Release 17)", 3GPP TR 23.700-40 V0.3.0, Jan. 30, 2020,total 62 pages.

3GPP TS 24.526 V16.3.0 (Mar. 2020), 3rd Generation Partnership Project; Technical Specification Group Core Network and Terminals; User Equipment (UE) policies for 5G System (5GS); Stage 3(Release 16), 51 pages.

3GPP TS 36.321 V9.3.0 (Jun. 2010)3rd Generation Partnership Project;Technical Specification Group Radio Access Network;Evolved Universal Terrestrial Radio Access (E-UTRA);Medium Access Control (MAC) protocol specification (Release 9),total 48 pages.

3GPP TS 36.331 V9.3.0,3rd Generation Partnership Project; Technical Specification Group Radio Access Network; Evolved Universal Terrestrial Radio Access (E-UTRA);Radio Resource Control (RRC);Protocol specification(Release 9),Jun. 2010,total 250 pages.

3GPP TS 38.300 V16.0.0 (Dec. 2019), 3rd Generation Partnership Project; Technical Specification Group Radio Access Network; NR; NR and NG-RAN Overall Description; Stage 2(Release 16), 101 pages.

3GPP TS 38.413 V16.1.0 (Mar. 2020), 3rd Generation Partnership Project; Technical Specification Group Radio Access Network; NG-RAN; NG Application Protocol (NGAP)(Release 16), 341 pages.

Generic Network Slice Template;Version 2.0;Oct. 16, 2019, Official Document NG.116-Generic Network Slice Template, GSM Association, Total 61 Pages.

Samsung et al.,"Key Issue on 5GC assisted cell selection to access network slice", SA WG2 Meeting #136 Ad-hoc S2-2001467, 13 Jan. 17, 2020, Incheon, Korea, total 4 pages.

China Telecom et al.,"Solution for Key Issue #12: NWDAF-assisted RFSP policy", SA WG2 Meeting #Ad-hoc 136 S2-2001565, Jan. 13-17, 2020, Incheon, Korea, total 6 pages.

* cited by examiner

L
COMMUNICATION METHOD AND APPARATUS

CROSS-REFERENCE TO RELATED APPLICATIONS

This is a continuation of International Patent Application No. PCT/CN2021/075686, filed on Feb. 6, 2021, which claims priority to Chinese Patent Application No. 202010432439.7, filed on May 20, 2020, and Chinese Patent Application No. 202010266217.2, filed on Apr. 7, 2020. All of the afore-mentioned patent applications are hereby incorporated by reference in their entireties.

TECHNICAL FIELD

Embodiments of this application relate to the field of communication technologies, and in particular, to a communication method and apparatus.

BACKGROUND

A physical network may be abstracted into a plurality of network slices. Each network slice forms an end-to-end logical network, and different network slices are logically isolated from each other. Each network slice may flexibly provide one or more network services as required, without affecting other network slices. Currently, there are the following types of standard-defined network slices: enhanced mobile broadband (eMBB) network slices, ultra-reliable and low-latency communication (URLLC) network slices, and massive internet of things (MIoT) network slices. Generally, different network slices have different performance requirements. For example, a network slice for augmented reality (AR) services or virtual reality (VR) services requires a high bandwidth and a low latency. A network slice for internet of things IOT services requires support of access of massive terminals, but is insensitive to a bandwidth and a latency. Considering different performance requirements of various network slices, different access network devices provide access for different network slices. For example, an access network device 1 supports access of the network slices MIoT and eMBB, but does not support access of the network slice URLLC; and an access network device 2 supports access of the network slices eMBB and URLLC, but does not support access of the network slice MIoT.

When a terminal user subscribes to the network slices URLLC and eMBB from an operator, if the terminal is located at a central location of a coverage area of the access network device 1 and is located at a cell edge of the access network device 2, and the terminal detects that signal quality of the access network device 1 is better, the terminal accesses a network via the access network device 1. If the terminal requests to access the network slice eMBB, and the access network device 1 exactly supports the network slice eMBB, an AMF device allows the terminal to register with the network. If the terminal requests to access the network slice URLLC, but the access network device 1 does not support the network slice URLLC, and the AMF device does not allow the terminal to register with the network, the terminal cannot normally access the network. Consequently, it is nonadjustable for the terminal to access the access network device 2 that supports the network slice URLLC, and accordingly the terminal cannot normally access the network slice URLLC.

SUMMARY

Embodiments of this application provide a communication method and apparatus, to resolve the following problem: In the case of requesting to access a network slice, if a terminal did not access an access network device that supports the network slice, it is nonadjustable for the terminal to access the access network device that supports the network slice.

According to a first aspect, a communication method is provided. A first access and mobility management function (AMF) device receives a first request message, where the first request message may include an identifier of a first network slice that a terminal requests to access and an identifier of a tracking area in which the terminal is located. The first AMF device may send a response message when the first AMF device determines that the tracking area supports the first network slice, where the response message includes a first radio access selection priority index corresponding to the first network slice. A radio access selection priority index is, for example, a radio access technology/frequency selection priority index (RFSP Index). The first radio access selection priority index is for selection of an access network device that supports the first network slice at the terminal. The response message may be a response accept message, or may be a response reject message.

After receiving the identifier of the network slice that the terminal requests to access and the identifier of the tracking area in which the terminal is located, the first AMF device may determine whether the tracking area supports the first network slice. If the tracking area supports the first network slice, there is usually one or more AMF devices and one or more access network devices in the tracking area that support the first network slice. In this case, the first AMF device may determine the first radio access selection priority index for the terminal, so that the first radio access selection priority index is for selection of an access network device that supports the first network slice at the terminal. Even if an access network device currently accessed by the terminal does not support the first network slice, in this application, a radio parameter corresponding to the first radio access selection priority index may be delivered to the terminal, and the terminal may perform cell or frequency reselection based on the radio parameter, to re-access the access network device that supports the first network slice.

In one embodiment, for receiving the first request message, the first AMF device may receive the first request message from a first device. For sending the response message, the first AMF device may send the response message to the first device. The first device may be a first access network device or a second AMF device. The first AMF device may be a default AMF device, or may not be a default AMF device. The second AMF device may be the default AMF device of the first access network device, and the second AMF device does not support the first network slice that the terminal requests to access in the tracking area.

In one embodiment, the first AMF device may determine that the first AMF device supports the first network slice. The first AMF device may be a default AMF device, or may not be a default AMF device.

In one embodiment, the first AMF device is the default AMF device, and the first AMF device determines that the first AMF device does not support the first network slice.

In one embodiment, when the first AMF device determines the first radio access selection priority index, it may be that if the first request message includes an identifier of one first network slice that the terminal requests to access, the first AMF device determines the first radio access selection priority index corresponding to the one first network slice; or if the first request message includes identifiers of a plurality of first network slices that the terminal requests to access, the first AMF device may select one first network slice from the plurality of first network slices, and determine the first radio access selection priority index corresponding to the one first network slice.

In one embodiment, when the first AMF device selects one first network slice from the plurality of first network slices, it may be that the first AMF device selects one first network slice from the plurality of first network slices based on priorities of the first network slices. Generally, the first AMF device selects a network slice with a highest priority to determine the first radio access selection priority index. The network slice with the highest priority may be a network slice corresponding to an identifier of a network slice at a foremost location in the first request message, or a network slice corresponding to an identifier of a network slice with a highest priority indication in the first request message.

In one embodiment, when the first AMF device determines the first radio access selection priority index corresponding to the one first network slice, it may be that the first AMF device uses a radio access selection priority index corresponding to the one first network slice in the tracking area as the first radio access selection priority index. One or more radio access selection priority indexes corresponding to each network slice may be preconfigured in the first AMF device. Radio access selection priority indexes corresponding to different network slices are the same or different.

In one embodiment, when the first AMF device determines the first radio access selection priority index corresponding to the one first network slice, it may be that the first AMF device determines the first radio access selection priority index based on a radio access selection priority index respectively corresponding to each network slice group supported by the tracking area, where a first network slice group corresponding to the first radio access selection priority index includes the one first network slice. One or more radio access selection priority indexes corresponding to each network slice group may be configured in the first AMF device. Radio access selection priority indexes corresponding to different network slice groups are the same or different.

In one embodiment, an access network device and/or an AMF device supporting the first network slice group supports each network slice in the first network slice group in the tracking area.

In one embodiment, when one radio access selection priority index corresponds to a plurality of network slices and there are a plurality of first network slices, the first AMF device may determine, from a plurality of radio access selection priority indexes based on radio access selection priority indexes respectively corresponding to the plurality of first network slices, a radio access selection priority index corresponding to a largest quantity of first network slices or a largest quantity of types of first network slices as the first radio access selection priority index.

In one embodiment, when one radio access selection priority index corresponds to a plurality of network slice groups and there are a plurality of first network slices, the first AMF device may determine, from a plurality of radio access selection priority indexes based on radio access selection priority indexes respectively corresponding to the plurality of first network slice groups, a radio access selection priority index corresponding to a largest quantity of first network slice groups as the first radio access selection priority index. A slice group including the first network slice is referred to as a first network slice group.

In one embodiment, the first AMF device receives configuration information, where the configuration information includes an identifier of a network slice supported by the tracking area and a radio access selection priority index respectively corresponding to the at least one network slice supported by the tracking area. The configuration information may alternatively include an identifier of at least one network slice supported by the first AMF device in the tracking area. In this way, the first AMF device can infer at least one network slice separately supported by an AMF device other than the first AMF device in all AMF devices that provide services for the tracking area, and a corresponding radio access selection priority index.

In one embodiment, the first AMF device receives configuration information, where the configuration information includes a network slice group supported by the tracking area and a radio access selection priority index respectively corresponding to at least one network slice group supported by the tracking area. The configuration information may alternatively include the at least one network slice group supported by the first AMF device in the tracking area. In this way, the first AMF device can infer at least one network slice group separately supported by an AMF device other than the first AMF device in all AMF devices that provides services for the tracking area, and a corresponding radio access selection priority index. When the network slice group is configured, it may be configured that a particular network slice belongs to a particular group.

According to a second aspect, a communication method is provided. A default access and mobility management function (AMF) device (for example, the second AMF device in the first aspect) for a first access network device receives a first request message from the first access network device. The first request message may include an identifier of at least one network slice that a terminal requests to access and an identifier of a tracking area in which the terminal is located. The default AMF device sends the first request message to a first AMF device when the default AMF device determines that the default AMF device does not support, in the tracking area, any one of the at least one network slice that the terminal requests to access. The first AMF device supports, in the tracking area, at least one of the at least one network slice that the terminal requests to access. The default AMF device receives a response message of the first request message from the first AMF device, and sends the response message to the first access network device, where the response message includes a first radio access selection priority index corresponding to the first network slice. The response message herein may be a response reject message, or may be a response accept message.

In one embodiment, the default AMF device receives configuration information, where the configuration information includes an identifier of at least one network slice supported in the tracking area and a radio access selection priority index respectively corresponding to at least one of network slices supported in the tracking area, and may further configure an identifier of at least one network slice supported by the default AMF device in the tracking area. In this way, the default AMF device not only configures at least one network slice supported by the default AMF device in the tracking area, but also configures identifiers of network slices separately supported by AMF devices other than the default AMF device in all AMF devices that provide services in the tracking area. One network slice may correspond to one or more radio access selection priority indexes, and radio access selection priority indexes corresponding to different network slices may be the same or may be different.

According to a third aspect, a communication method is provided. A network data analytics function (NWDAF)

device receives an analysis request message from an analysis requester, where the analysis request message includes an identifier of a tracking area. The NWDAF device obtains a plurality of pieces of registration-related information from a plurality of AMF devices in the tracking area, where each piece of registration-related information includes an identifier of a network slice included in a registration request message sent by the terminal, whether a response message of the registration request message is accepted, and a radio access selection priority index included in the response message of the registration request message. The NWDAF device analyzes, based on the plurality of pieces of obtained registration-related information, a radio access selection priority index corresponding to at least one network slice supported by the tracking area. The NWDAF device provides, for an analysis requester, a radio access selection priority index corresponding to at least one network slice supported by the tracking area as an analysis result.

In one embodiment, the NWDAF device may alternatively obtain device deployment information in the tracking area from an OAM device. The device deployment information includes a connection relationship between an access device and an AMF device, a connection relationship between AMF devices, a network slice supported by each of at least one access device, and a network slice supported by each of at least one AMF device. The registration-related information obtained by the NWDAF device from the AMF device may alternatively include an identifier of an access network device at which the registration request message arrives and an identifier of an AMF device that processes the registration request message. When the NWDAF device obtains, through analysis based on the plurality of pieces of obtained registration-related information, the radio access selection priority index corresponding to the at least one network slice, it may be that the NWDAF device obtains, through analysis based on the obtained device deployment information in the tracking area and the plurality of pieces of obtained registration-related information, the radio access selection priority index corresponding to the at least one network slice.

In one embodiment, the registration-related information may alternatively include an identifier of at least one network slice allowed to be accessed. When the NWDAF device obtains, through analysis based on the plurality of pieces of obtained registration-related information, the radio access selection priority index corresponding to the at least one network slice, it may be that the NWDAF device obtains, through analysis based on the plurality of pieces of obtained registration-related information, a radio access selection priority index with a highest access success rate corresponding to the at least one network slice.

According to a fourth aspect, a communication method is further provided. The method includes: An access and mobility management function (AMF) device receives a request message from a first access network device, where the request message includes information about a network slice that a terminal requests to access. The AMF device determines information about a network slice allowed to be accessed by the terminal, where the network slice allowed to be accessed by the terminal is a network slice supported by a current cell accessed by the terminal or a neighboring cell of the current cell in the network slice requested to be accessed by the terminal. The AMF device obtains a radio access selection priority index corresponding to the network slice allowed to be accessed by the terminal; and sends a response message to the first access network device, where the response message includes the radio access selection priority index.

According to the foregoing method, because an S-NSSAI included in an allowed NSSAI determined for the UE may be supported by the cell in which the UE is currently located or a neighboring cell of the cell in which the UE is currently located, the access network device may help, based on an RFSP index, the UE reselect a cell that supports the allowed NSSAI, and normally access these network slices. A cell in which the UE is currently located may be served by the first access network device, and a neighboring cell of the cell in which the UE is currently located may be served by the first access network device or a second access network device.

In one embodiment, that the AMF device obtains a radio access selection priority index corresponding to the network slice allowed to be accessed by the terminal includes: the AMF device determines the radio access selection priority index corresponding to the network slice allowed to be accessed by the terminal; or the AMF device sends, to a policy control function (PCF) device, information about the network slice allowed to be accessed by the terminal, and receives, from the PCF device, the radio access selection priority index corresponding to the network slice allowed to be accessed by the terminal.

In one embodiment, the radio access selection priority index is used by the terminal to access a cell that supports the network slice allowed to be accessed by the terminal, the cell is served by the first access network device or a second access network device, and the second access network device serves a neighboring cell of a current cell accessed by the terminal. In one embodiment, the at least one cell further includes at least one cell that is served by the second access network device and that has a neighboring relationship with the cell served by the first access network device.

According to a fifth aspect, a communication apparatus is provided. The communication apparatus has a function of implementing in any one of the first aspect or the embodiments of the first aspect, or a function of implementing in any one of the second aspect or the embodiments of the second aspect, or a function of implementing in any one of the fourth aspect or the embodiments of the fourth aspect. These functions may be implemented by hardware, or may be implemented by hardware by executing corresponding software. The hardware or software includes one or more function modules corresponding to the foregoing function.

According to a sixth aspect, a communication apparatus is provided. The communication apparatus has a function of implementing in any one of the third aspect or the embodiments of the third aspect. These functions may be implemented by hardware, or may be implemented by hardware by executing corresponding software. The hardware or software includes one or more function modules corresponding to the foregoing function.

According to a seventh aspect, a communication apparatus is provided. The apparatus may be the first AMF device in any one of the first aspect or the embodiments of the first aspect, or the default AMF device in any one of the second aspect or the embodiments of the second aspect, or the AMF device in any one of the fourth aspect or the embodiments of the fourth aspect, or a chip disposed in the first AMF device, the default AMF device, or the AMF device. The apparatus includes a transceiver and a processor, and, in one embodiment, further includes a memory. The memory is configured to store a computer program or instructions. The processor is separately coupled to the memory and the transceiver. When the processor executes the computer program or the instructions, the apparatus is enabled to perform, by using the transceiver, the method performed by the first device in any one of the first aspect or the embodiments of the first aspect, or the method performed by the default AMF device in any one of the second aspect or the embodiments of the second aspect, or the method performed by the AMF device in any one of the fourth aspect or the embodiments of the fourth aspect.

According to an eighth aspect, a communication apparatus is provided. The apparatus may be the NWDAF device in any one of the third aspect or the embodiments of the third aspect of the method, or a chip disposed in the NWDAF device. The apparatus includes a transceiver and a processor, and in one embodiment, further includes a memory. The memory is configured to store a computer program or instructions. The processor is separately coupled to the memory and the transceiver. When the processor executes the computer program or the instructions, the apparatus is enabled to perform, by using the transceiver, the method performed by the NWDAF device in any one of the third aspect or the embodiments of the third aspect.

According to a ninth aspect, a computer program product is provided. The computer program product includes computer program code. When the computer program code is run on a computer, the computer is enabled to perform the method performed by the first AMF device in any one of the first aspect and the embodiments of the first aspect, or the method performed by the default AMF device in any one of the second aspect and the embodiments of the second aspect, or the method performed by the AMF device in any one of the fourth aspect and the embodiments of the fourth aspect.

According to a tenth aspect, a computer program product is provided. The computer program product includes computer program code. When the computer program code is run on a computer, the computer is enabled to perform the method performed by the NWDAF device in any one of the third aspect or the embodiments of the third aspect.

According to an eleventh aspect, this application provides a chip system. The chip system includes a processor and a memory, where the processor and the memory are electrically coupled, the memory is configured to store computer program instructions, and the processor is configured to execute some or all of the computer program instructions in the memory. When the some or all of the computer program instructions are executed, the processor is configured to implement a function of the first AMF device in the method according to any one of the first aspect or the embodiments of the first aspect, or implement a function of the default AMF device in the method according to any one of the second aspect or the embodiments of the second aspect, or implement a function of the AMF device in the method according to any one of the fourth aspect or the embodiments of the fourth aspect.

In one embodiment, the chip system may further include a transceiver. The transceiver is configured to send a signal processed by the processor, or receive a signal input to the processor. The chip system may include a chip, or may include a chip and another discrete component.

According to a twelfth aspect, this application provides a chip system. The chip system includes a processor and a memory, where the processor and the memory are electrically coupled, the memory is configured to store computer program instructions, and the processor is configured to execute some or all of the computer program instructions in the memory. When the some or all of the computer program instructions are executed, the processor is configured to implement a function of the NWDAF device in the method according to any one of the third aspect or the embodiments of the third aspect.

In one embodiment, the chip system may further include a transceiver. The transceiver is configured to send a signal processed by the processor, or receive a signal input to the processor. The chip system may include a chip, or may include a chip and another discrete component.

According to a thirteenth aspect, a computer-readable storage medium is provided. The computer-readable storage medium stores a computer program. When the computer program is run, the method performed by the first AMF device in any one of the first aspect and the embodiments of the first aspect, the method performed by the default AMF device in any one of the second aspect and the embodiments of the second aspect, the method performed by the NWDAF device in any one of the third aspect and the embodiments of the third aspect, or the method performed by the AMF device in any one of the fourth aspect and the embodiments of the fourth aspect is performed.

According to a fourteenth aspect, a communication system is provided. The system includes the first AMF device that performs the method in any one of the first aspect or the embodiments of the first aspect, and the default AMF device that performs the method in any one of the second aspect or the embodiments of the second aspect.

In one embodiment, the communication system further includes the NWDAF device that performs the method in any one of the third aspect and the embodiments of the third aspect.

DESCRIPTION OF EMBODIMENTS

The following describes in detail embodiments of this application with reference to accompanying drawings.

For ease of understanding embodiments of this application, the following describes a part of terms in embodiments of this application, to help a person skilled in the art have a better understanding.

The technical solutions in embodiments of this application may be applied to various communication systems, for example, a long term evolution (LTE) system, a worldwide interoperability for microwave access (wWiMAX) communication system, and a 5th generation (5G) system, for example, a new radio (NR) access technology, and a future communication system.

In this application, a 5G communication system is used as an example for description.

Figure 1A:
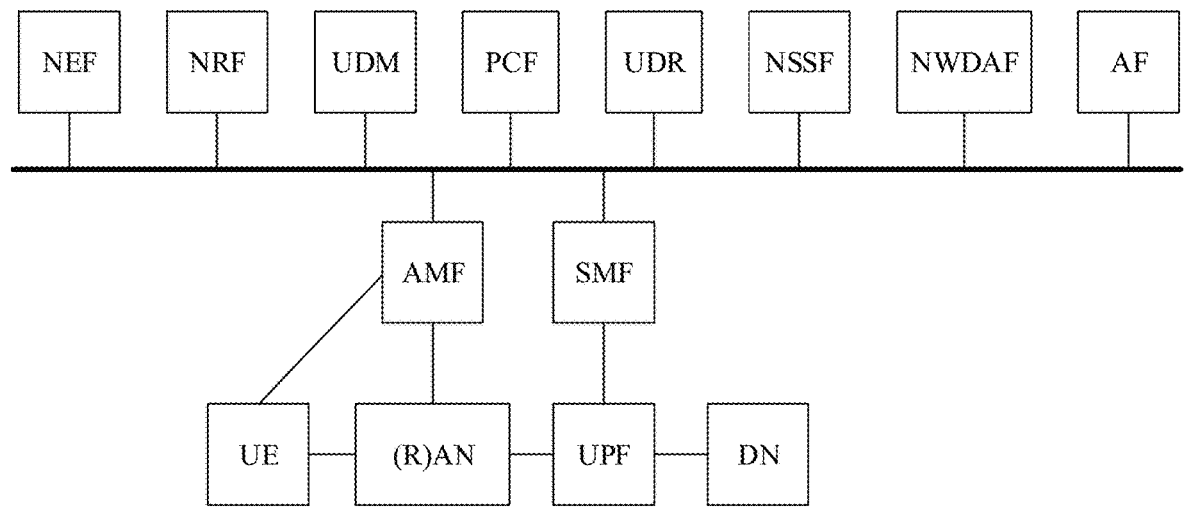
FIG. 1a and FIG. 1B each are a schematic diagram of an architecture of a communication system according to an embodiment of this application.

For example, FIG. 1a is a schematic diagram of an architecture of a 5G communication system to which this application is applicable. In one embodiment, FIG. 1a is a schematic diagram of a service-based 5G network architecture. The 5G network architecture shown in FIG. 1a may include a terminal device part, an access network part, and a core network part. In one embodiment, a data network (DN) and an application function (AF) network element part are further included. A terminal accesses a core network through an access network, and the core network communicates with the DN or the AF. The following briefly describes functions of some network elements.

A terminal device, which may also be referred to as user equipment (UE), is a device that has a wireless transceiver function. The terminal device may be deployed on land, where the deployment includes indoor or outdoor, or handheld or vehicle-mounted deployment; may be deployed on water (for example, on a ship); or may be deployed in air (for example, on an airplane, a balloon, and a satellite). The terminal device may be a mobile phone, a tablet computer (pad), a computer having a wireless transceiver function, a VR terminal device, an AR terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like.

A (R)AN device in this application is a device that provides a wireless communication function for the terminal device, and the (R)AN device is also referred to as an access network device. The RAN device in this application includes but is not limited to: a next generation base station (gNodeB, gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmitting and receiving point (TRP), a transmitting point (TP), a mobile switching center, and the like.

The data network (DN) may have a plurality of services deployed, and may provide a terminal device with services such as a data service and/or a voice service. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transmit collected sensor data to the control server according to the instructions, and so on. For another example, the DN is an internal office network of a company, a mobile phone or a computer of an employee of the company may be a terminal device, and the mobile phone or the computer of the employee may access information, data resources, and the like in the internal office network of the company.

An application network element mainly supports interaction with a 3rd generation partnership project (3GPP) core network to provide services, for example, affect a data routing decision, a policy control function, or provide some third-party services for a network side. In the 5G communication system, the application network element may be the AF network element. In the future communication system, the application network element may still be the AF network element, or may have another name. This is not limited in this application.

The core network part may include one or more of the following network elements.

An access management network element is a control plane network element provided by an operator network, and is responsible for access control and mobility management for accessing the operator network by the terminal device, for example, including functions such as mobility status management, allocation of a temporary user identity, and user authentication and authorization. In the 5G communication system, the access management network element may be an access and mobility management function (AMF) network element. In the future communication system, the access management network element may still be the AMF network element, or may have another name. This is not limited in this application.

A session management network element is mainly responsible for session management in a mobile network, for example, session establishment, modification, and release. Particular functions may be allocating an IP address to a user, selecting a user plane network element that provides a packet forwarding function, and the like. In the 5G communication system, the session management network element may be a session management function (SMF) network element. In the future communication system, the session management network element may still be the SMF network element, or may have another name. This is not limited in this application.

A user plane network element is responsible for forwarding and reception of user data in the terminal device. The user plane network element may receive the user data from the data network, and transmit the user data to the terminal device through the access network device. In addition, the user plane network element may alternatively receive the user data from the terminal device through the access network device, and forward the user data to the data network. A transmission resource and a scheduling function in the user plane network element that provide a service for the terminal device are managed and controlled by the SMF network element. In the 5G communication system, the user plane network element may be a user plane function (UPF) network element. In the future communication system, the user plane network element may still be the UPF network element, or may have another name. This is not limited in this application.

A data management network element is configured to generate an authentication credential, process a subscriber identifier (for example, store and manage a subscription permanent identifier), control access authorization, manage subscription data, and so on. In the 5G communication system, the data management network element may be a unified data management (UDM) network element. In the future communication system, the unified data management network element may still be the UDM network element, or may have another name. This is not limited in this application.

A policy control network element mainly supports providing a unified policy framework to control network behavior and providing a policy rule for a control layer network function, and is responsible for obtaining user subscription information related to a policy decision. In a 4G communication system, the policy control network element may be a policy and charging rules function (PCRF) network element. In the 5G communication system, the policy control network element may be a policy control function (PCF) network element. In the future communication system, the policy control network element may still be the PCF network element, or may have another name. This is not limited in this application.

A network repository network element may be configured to provide a network element discovery function and provide, based on a request from another network element, network element information corresponding to a network element type. An NRF further provides network element management services, for example, registration, update, and deregistration of a network element and subscription and push of a network element status. In the 5G communication system, the network repository network element (NRF) may be a network registration function network element. In the future communication system, the network repository network element may still be the NRF network element, or may have another name. This is not limited in this application.

A network exposure function network element may be configured to securely expose, to the outside, a service, a capability, and the like that are provided by a 3GPP network function device. In the 5G communication system, the network exposure function network element may be the network exposure function (NEF) network element. In the future communication system, the network exposure function network element may still be the NEF network element, or may have another name. This is not limited in this application.

A network slice selection network element may be used for selecting an appropriate network slice for a service of a terminal. In the 5G communication system, the network slice selection network element may be a network slice selection function (NSSF) network element. In the future communication system, the network exposure function network element may still be the NSSF network element, or may have another name. This is not limited in this application.

A network data analytics network element may collect data from each network function (NF), for example, the policy control network element, the session management network element, the user plane network element, the access management network element, and the application function network element (by using a network capability exposure function network element), and perform analysis and prediction. In the 5G communication system, the network data analytics network element may be a network data analytics function (NWDAF). In the future communication system, the network exposure function network element may still be the NWDAF network element, or may have another name. This is not limited in this application.

A unified data repository network element is responsible for storing structured data information, including subscription information, policy information, and network data or service data defined in a standard format. In the 5G communication system, the unified data repository network element may be a unified data repository (UDR). In the future communication system, the network exposure function network element may still be the UDR network element, or may have another name. This is not limited in this application.

It may be understood that the network elements or the functions may be network elements in a hardware device, may be software functions running on dedicated hardware, or may be virtualized functions instantiated on a platform (for example, a cloud platform). In one embodiment, the network elements or the functions may be implemented by one device, may be jointly implemented by a plurality of devices, or may be one function module in one device. This is not limited in embodiments of this application.

5GC network functions such as the NSSF, NRF, NWDAF, UDM, UDR and the AMF usually separately process services of a plurality of network slices. The SMF and the UPF generally process a service of a particular network slice. The PCF may process services of the plurality of network slices, or may process only the service of the particular network slice. The access network device usually processes the services of the plurality of network slices.

A physical network may be abstracted into a plurality of network slices. Each network slice forms an end-to-end logical network, and different network slices are logically isolated from each other. Each network slice may flexibly provide one or more network services as required, without affecting other network slices. Currently, there are the following types of standard-defined network slices: eMBB, URLLC, and MIoT.

It should be understood that the foregoing network architecture applied to embodiments of this application is merely an example network architecture that is described from a perspective of a service-oriented architecture. A network architecture applicable to embodiments of this application is not limited thereto. Any network architecture that can implement functions of the foregoing devices is applicable to embodiments of this application.

For ease of understanding embodiments of this application, the following describes application scenarios of this application. The service scenarios described in embodiments of this application are intended to describe the technical solutions in embodiments of this application more clearly, but constitutes no limitation on the technical solutions provided in embodiments of this application. A person of ordinary skill in the art may learn that the technical solutions provided in embodiments of this application are also applicable to a similar technical problem as a new service scenario emerges.

Service areas of two different network slices may be completely different, may partially overlap, or may be completely the same. A service area of one network slice may include one or more tracking areas (TA). The TA uses a tracking area identifier (TAI) to identify a tracking area, where the TAI includes a mobile country code (MCC), a mobile network code (MNC), and a tracking area code (TAC). Alternatively, the tracking area may be identified using the TAC. One or more AMF devices may be deployed in one tracking area to serve the tracking area, or one or more access network devices may be deployed to serve the tracking area. One or more network slices may be supported in one tracking area. When the tracking area supports a network slice a, at least one of AMF devices serving the tracking area supports the network slice a. When an AMF device supports a network slice a, at least one of access network devices connected to the AMF device supports the network slice a.

One AMF device may serve one tracking area, or may serve a plurality of tracking areas. One AMF device may support a same network slice or different network slices in different tracking areas. For example, both a tracking area 1 and a tracking area 2 support network slices a and b, and an AMF device serves both the tracking area 1 and the tracking area 2. The AMF device supports the network slice b but does not support the network slice a in the tracking area 1, and the AMF device supports both the network slice a and the network slice b in the tracking area 2.

An access network device may support one or more frequencies (frequency bands, or the like). Different frequencies are used to support different network slices, and each frequency may correspond to one cell. Therefore, one access network device may serve one or more cells. A cell currently accessed by UE using a frequency of the access network device may be referred to as a current cell. A cell that corresponds to another frequency and that is not accessed by the access network device, or a cell corresponding to another access network device may be referred to as a neighboring cell (neighboring cell(s)) of the current cell. It may be understood that the tracking area served by the access network device includes at least the current cell and the neighboring cell. In one embodiment, the tracking area may alternatively include another cell that is not adjacent to the current cell.

Generally, different network slices have different performance requirements. For example, a network slice for AR services or VR services requires a high bandwidth and a low latency. A network slice for IOT services requires support of access of massive terminals, but is insensitive to a bandwidth and a latency. Features of a wireless network vary greatly in frequency bands. For example, a low and medium frequency band has a larger coverage area and lower power consumption, and supports a low network access rate; and a high frequency band has a smaller coverage area and higher power consumption, and supports a higher network access rate and a low latency.

Figure 1B:
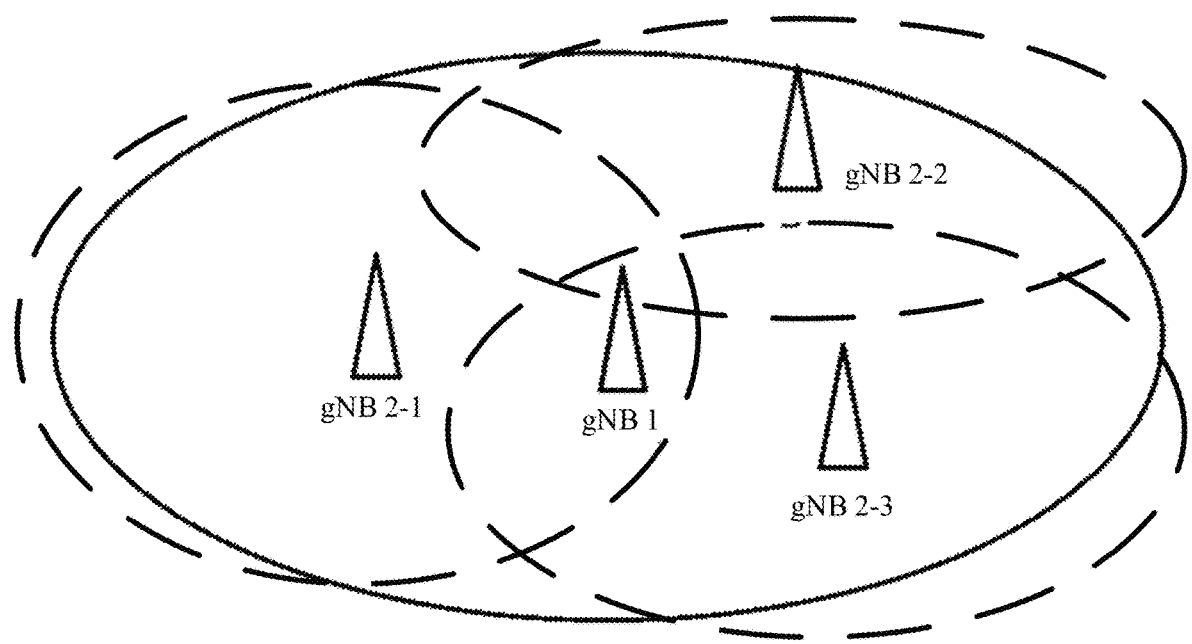

Considering different performance requirements of various network slices, different frequencies may be used for different network slices or even different access network devices provided access for different network slices. As shown in FIG. 1B, in a tracking area TA, an access network device gNB 1 uses low and medium frequency bands to cover the entire TA, and provides access to network slices MIoT and eMBB. A gNB 2-1, a gNB 2-2, and a gNB 2-3 provide access to network slices eMBB and URLLC in a high frequency band, and separately cover a part of the entire TA. However, from the perspective of a core network, access of three network slices is provided within a TA range: an MIoT network slice, an eMBB network slice, and a URLLC network slice.

In a current technology, it is assumed that a terminal user subscribes to the network slices URLLC and eMBB from an operator. If the terminal is located at a central location of a coverage area of the gNB 1, and is located at cell edges of the gNB 2-1, the gNB 2-2, and the gNB 2-3, and the terminal detects that signal quality of the gNB 1 is better, the terminal accesses a network via the gNB 1. If the terminal requests to access the network slice URLLC, but the gNB 1 does not support the network slice URLLC, and an AMF device does not allow the terminal to register with a network, it is nonadjustable for the terminal to access the gNB 2-1, gNB 2-2, or gNB 2-3, and accordingly the terminal cannot normally access the network slice URLLC.

Based on this, the following describes a communication technical solution. After receiving an identifier of a network slice that a terminal requests to access and an identifier of a tracking area in which the terminal is located, an AMF device may determine whether the tracking area supports a first network slice. If the tracking area supports the first network slice, there is usually one or more AMF devices and one or more access network devices in the tracking area that support the first network slice. In this case, the AMF device may determine a first radio access selection priority index for the terminal, so that the first radio access selection priority index is for selection of an access network device that supports the first network slice at the terminal. Even if an access network device currently accessed by the terminal does not support the first network slice, in this application, a radio parameter corresponding to the first radio access selection priority index may be delivered to the terminal, and the terminal may perform cell or frequency reselection based on the radio parameter, to re-access the access network device that supports the first network slice.

The following describes the solution in detail with reference to the accompanying drawings. Features or content marked by dashed lines in the accompanying drawings may be understood as optional operations or optional structures in embodiments of this application.

The term "and/or" in this application describes an association relationship between associated objects and indicates that three relationships may exist. For example, A and/or B may represent the following three cases: Only A exists, both A and B exist, and only B exists. The character "/" generally indicates an "or" relationship between the associated objects.

"A plurality of" in this application means two or more.

In the descriptions of this application, terms such as "first" and "second" are used only for distinction and description, but cannot be understood as an indication or implication of relative importance, or as an indication or implication of an order.

In addition, the word "example" in embodiments of this application is used to represent giving an example, an illustration, or a description. Any embodiment or implementation solution described as an "example" in this application should not be explained as being more preferred or having more advantages than another embodiment or implementation solution. Exactly, the word "example" is used to present a concept in a particular manner.

Figure 2A:
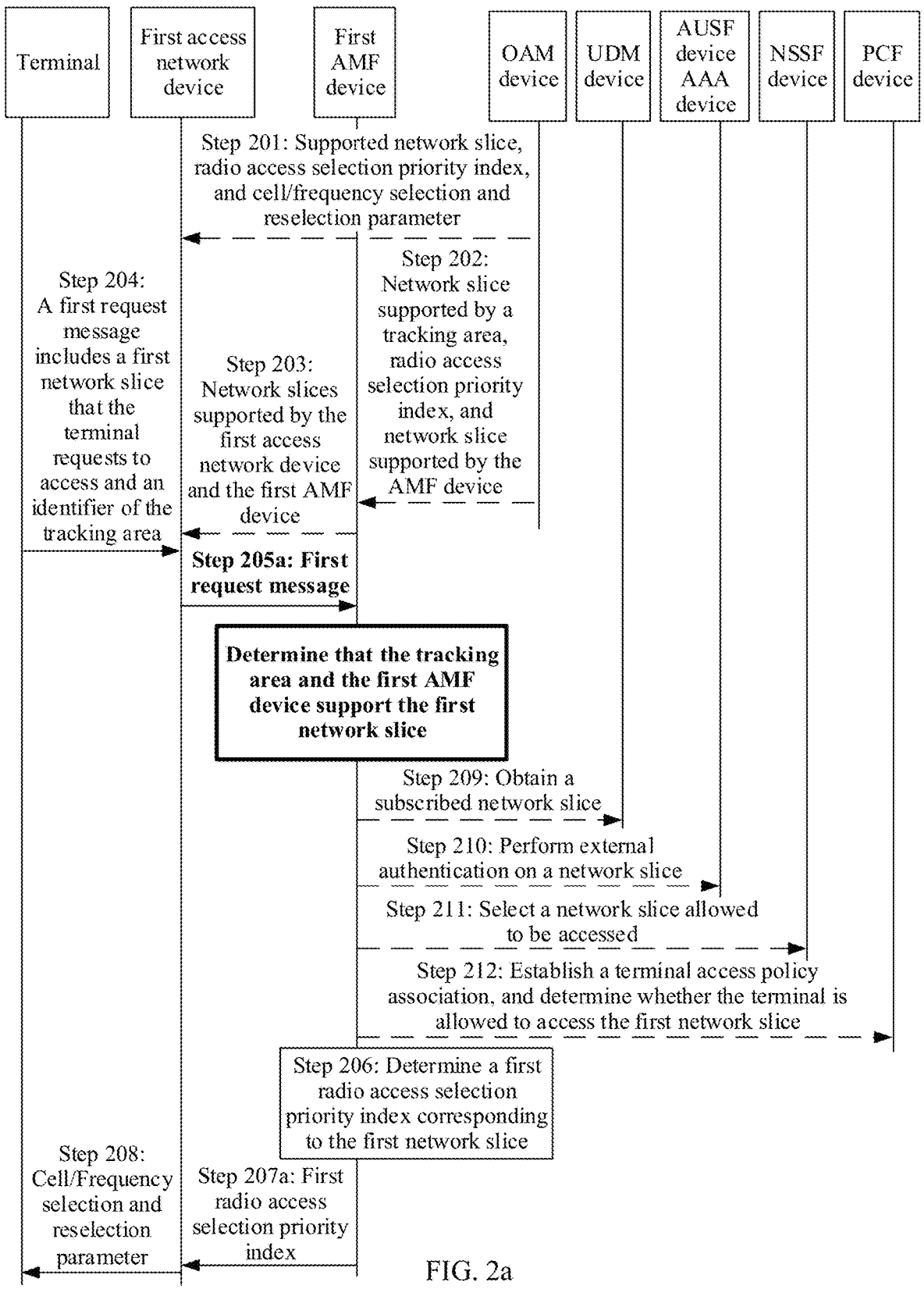
FIG. 2a, FIG. 2b, FIG. 2c and FIG. 4 each are a schematic diagram of a communication process according to an embodiment of this application.
Figure 2B:
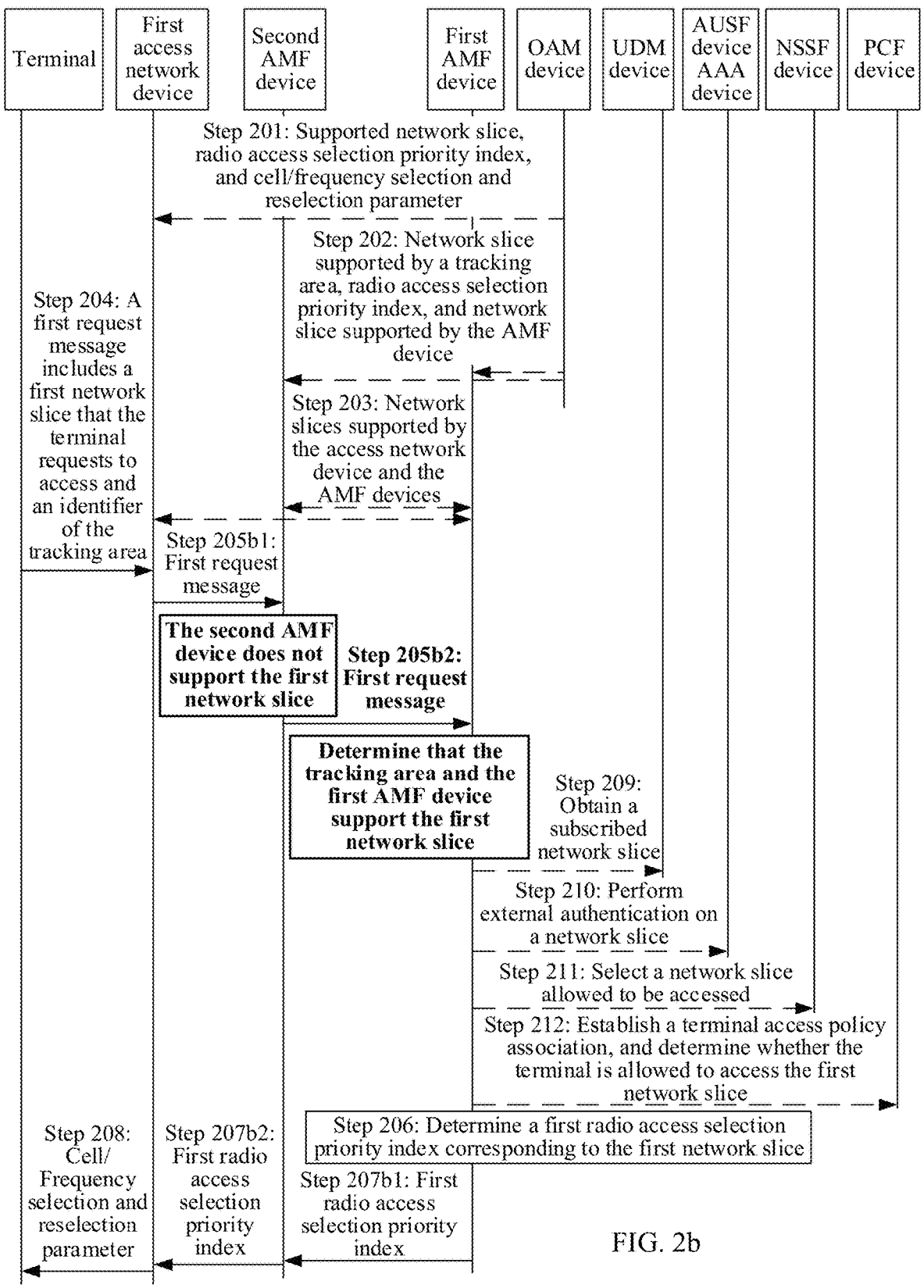
Figure 2C:
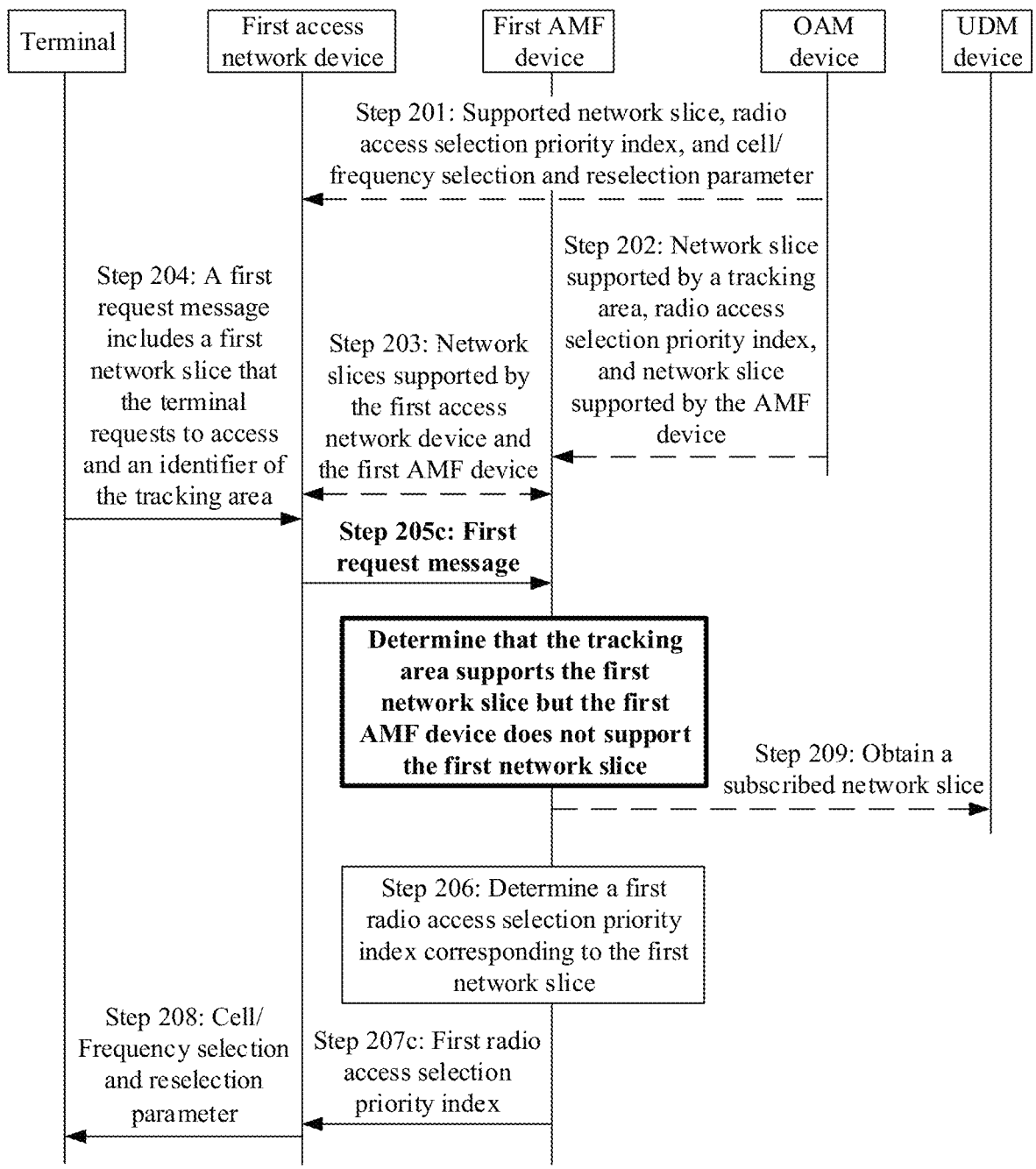

FIG. 2a, FIG. 2b, and FIG. 2c each show a schematic diagram of a communication process, which includes the following operations.

Operation 201: In a network slice planning and deployment process, a management plane operation, administration and maintenance (OAM) device configures, for an access network device, an identifier of a network slice supported by the access network device; configures, for each network slice, one or more radio access selection priority indexes corresponding to the network slice; and further configures, for each radio access selection priority index, a group of cell/frequency selection and reselection parameters corresponding to the radio access selection priority index. In one embodiment, the OAM device may alternatively configure a frequency, a cell identifier, and a neighboring cell relationship of the access network device. The radio access selection priority index is, for example, a RFSP Index.

One network slice may correspond to one or more radio access selection priority indexes. For example, a plurality of frequencies may simultaneously support one network slice. For this network slice, different radio access selection priority indexes may be configured for different frequencies. For example, a radio access selection priority index is configured for a lower frequency, and a radio access selection priority index is configured for a higher frequency. One radio access selection priority index may correspond to one or more network slices. For example, the access network device may provide access to a plurality of network slices at one frequency. When one radio access index is configured for one frequency, the plurality of network slices correspond to one radio access selection priority index.

For example, identifiers that are of network slices supported by a gNB 1 and that are configured by the OAM device for the gNB 1 are an S-NSSAI #1, an S-NSSAI #3, and an S-NSSAI #5. The S-NSSAI #1, S-NSSAI #3, and S-NSSAI #5 all correspond to a radio access selection priority index #1. Identifiers that are of network slices supported by a gNB 2 and that are configured by the OAM device for the gNB 2 are an S-NSSAI #2 and an S-NSSAI #4. The S-NSSAI #2 corresponds to a radio access selection priority index #2 and a radio access selection priority index

3. The S-NSSAI #4 corresponds to the radio access selection priority index #2 and the radio access selection priority index #3.

A cell/frequency selection and reselection parameter corresponding to the radio access selection priority index #2 may include: setting a frequency priority of the gNB 2 to a high value, or setting a cell selection signal strength threshold of the gNB 2 to a small value, or when there is no interface connection between a gNB 3 in the neighboring cell and an AMF device supporting the S-NSSAI #2, setting the gNB 3 to access barred or setting a frequency of the gNB 3 to access barred.

Operation 201 is an optional operation, and the access network device may alternatively obtain information that needs to be obtained in operation 201 in another manner.

Operation 202: The AMF device receives configuration information from the OAM device.

In an example, the configuration information includes an identifier of a network slice supported by a tracking area and one or more radio access selection priority indexes respectively corresponding to at least one network slice in the network slice supported by the tracking area. The configuration information may alternatively include an identifier of at least one network slice supported in the tracking area by the AMF device. The AMF device can infer at least one network slice separately supported by an AMF device other than the AMF device in all AMF devices that provide services for the tracking area, and one or more corresponding radio access selection priority indexes. Alternatively, at least one network slice separately supported by an AMF device other than a first AMF device in all AMF devices that provide services for the tracking area may be configured for the AMF device.

In another example, the configuration information includes a network slice group supported by the tracking area. When the network slice group is configured, an identifier of a group to which each network slice belongs may be configured for each network slice. For example, the identifier of the group is a number 1 or 2, or the identifier of the group is a name of the group. Network slices corresponding to an identifier of a same group belong to a same network slice group. One or more radio access selection priority indexes respectively corresponding to at least one network slice group in network slice group supported by the tracking area may alternatively be configured. The configuration information may alternatively include the at least one network slice group supported in the tracking area by the AMF device. In this way, the AMF device can infer at least one network slice group separately supported by an AMF device other than the AMF device in all AMF devices that provide services for the tracking area, and one or more corresponding radio access selection priority indexes. Alternatively, at least one network slice group separately supported by an AMF device other than the AMF device in all AMF devices that provide services for the tracking area may be configured for the AMF device.

For a same network slice/network slice group, a radio access selection priority index configured for the AMF device is the same as a radio access selection priority index configured for the access network device. For a core network side, a cell of the access network device is not concerned, and a cell/frequency selection and reselection parameter may not be configured on the AMF device. For the AMF device, the AMF device supports a network slice a and/or a network slice group b, and one or more access network devices connected to the AMF device usually also support the network slice a and/or the network slice group b.

Figure 3A:
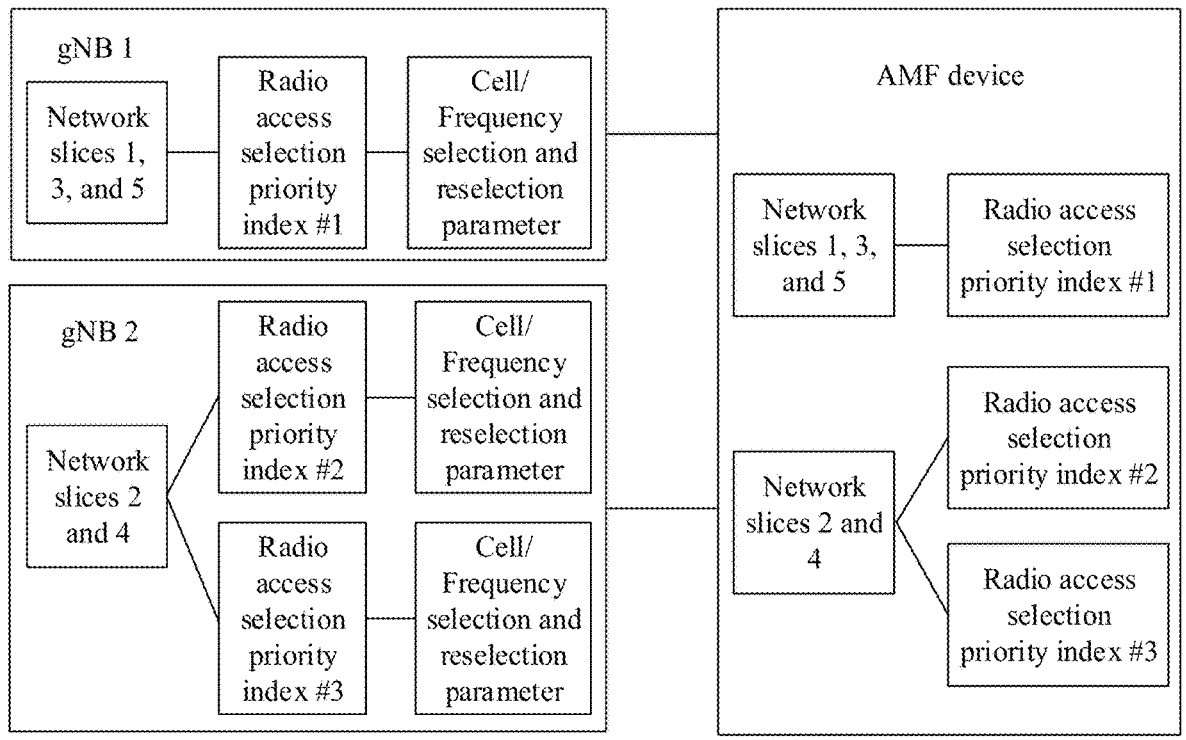
FIG. 3a and FIG. 3b each are a schematic diagram of network slice grouping according to an embodiment of this application.

As shown in FIG. 3a, a tracking area supports network slices 1 to 5, which are divided into two groups. A gNB 1 supports a network slice group 1 including network slices 1, 3, and 5, and a gNB 2 supports a network slice group 2 including network slices 2 and 4. In the gNB 1 and the AMF device, one radio access selection priority index #1 may be configured for the network slice group 1. In other words, the network slices 1, 3, and 5 all correspond to the radio access selection priority index #1. In the gNB 2 and the AMF device, two radio access selection priority indexes #2 and #3 are configured for the network slice group 2. In other words, the network slice 2 corresponds to the radio access selection priority indexes #2 and #3, and the network slice 4 also corresponds to the radio access selection priority indexes #2 and #3. In the gNB 1 and gNB 2, for each radio access selection priority index, a group of cell/frequency selection and reselection parameters corresponding to the radio access selection priority index are further configured.

Figure 3B:
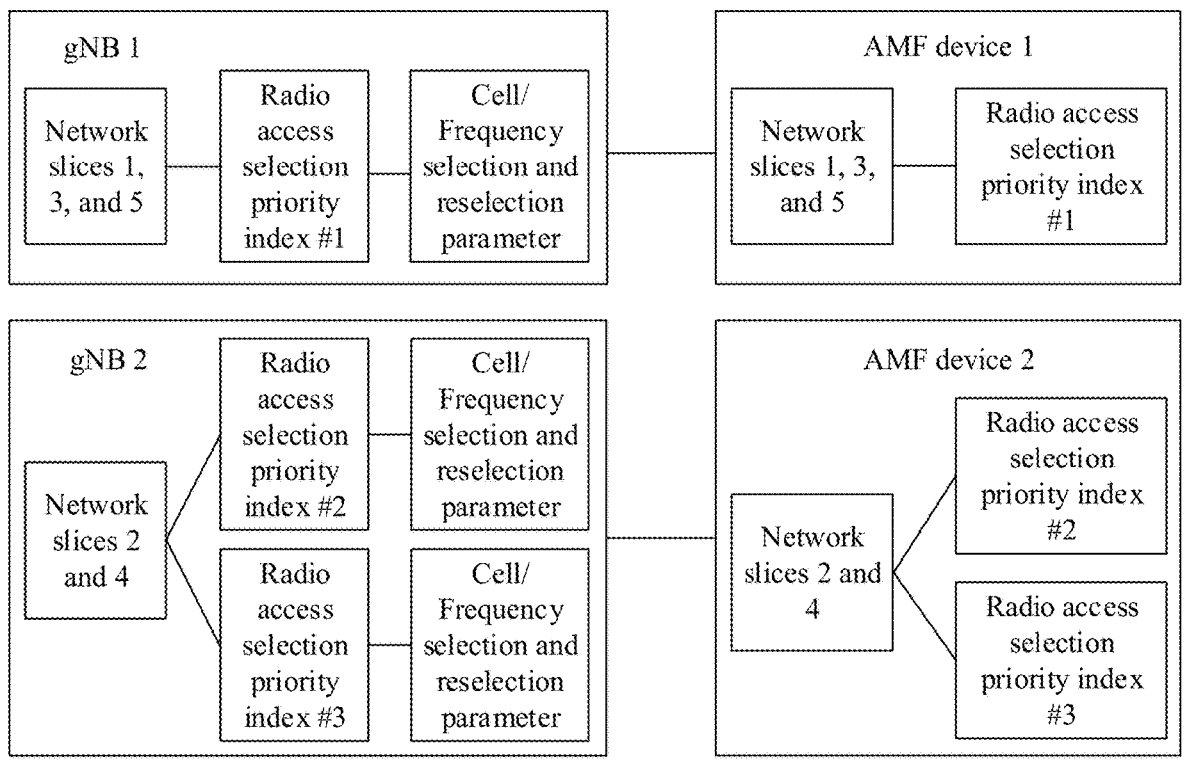

As shown in FIG. 3b, a tracking area supports network slices 1 to 5, which are divided into two groups. A gNB 1 and an AMF device 1 support a network slice group 1 including network slices 1, 3, and 5, and a gNB 2 and an AMF device 2 support a network slice group 2 including network slices 2 and 4. The gNB 1 and the AMF device 1 may configure one radio access selection priority index #1 for the network slice group 1. Two radio access selection priority indexes #2 and #3 are configured for the network slice group 2 in the gNB 2 and the AMF device 2. In other words, the network slice 2 corresponds to the radio access selection priority indexes #2 and #3, and the network slice 4 also corresponds to the radio access selection priority indexes #2 and #3. In the gNB 1 and gNB 2, for each radio access selection priority index, a group of cell/frequency selection and reselection parameters corresponding to the radio access selection priority index are further configured.

Operation 202 is an optional operation, and the AMF device may alternatively obtain information that needs to be obtained in operation 202 in another manner. For example, a radio access selection priority index corresponding to each network slice may be obtained by using a network data analytics function NWDAF device. A process in which the network data analytics function NWDAF device determines the radio access selection priority index corresponding to each network slice is described in the following FIG. 4.

Operation 203: The access network device and the AMF device exchange an identifier of a network slice supported in the tracking area by the access network device and the AMF device. For example, the gNB 1 reports, to the AMF device, the network slices S-NSSAI #1, S-NSSAI #3, and S-NSSAI #5 supported in a TA, and the gNB 2 reports, to the AMF device, the S-NSSAI #2 and S-NSSAI #4 supported in the TA. The AMF device also notifies the gNB 1 and the gNB 2 that the AMF device simultaneously supports the S-NSSAI #1 to S-NSSAI #5 in the TA. The AMF device stores the radio access selection priority index corresponding to each network slice, and the AMF device and the access network device may exchange the radio access selection priority index corresponding to the network slice. In this process, the AMF device stores an identifier of a network slice respectively supported by each access network device connected to the AMF device. The access network device also stores a network slice respectively supported by each AMF device connected to the access network device.

Operation 204: A terminal sends a first request message to a first access network device, and accordingly the first access network device receives the first request message sent by the terminal. The first request message includes an identifier of a first network slice that the terminal requests to access and an identifier of a tracking area in which the terminal is located. The first request message may further include a cell identifier in which the terminal is located. The cell identifier may be, for example, a cell global identifier (CGI).

After the terminal is powered on or enters another tracking area from a tracking area, the terminal may perform cell selection and/or frequency selection using parameters in system broadcast information of a plurality of access network devices, to request to access the first access network device with better signal strength. The terminal sends the first request message to the camping first access network device. The first request message may be, for example, a registration request message. The first request message may carry identifiers of one or more first network slices that the terminal requests to access and the identifier of the tracking area in which the terminal is located. The terminal expects to access the one or more first network slices in the tracking area in which the terminal is currently located. In one embodiment, the first request message may include requested network slice selection assistance information (Requested NSSAI), and the NSSAI that the terminal requests to access includes one or more pieces of single network slice selection assistance information S-NSSAI. For example, the NSSAI that the terminal requests to access may be a list of S-NSSAI corresponding to the one or more network slices that the terminal requests to access. For example, the terminal subscribes to network slices identified by S-NSSAI #2 and S-NSSAI #3, and the terminal expects to access the two slices at the same time. Therefore, the requested NSSAI is {S-NSSAI #2, S-NSSAI #3}.

In an example, as shown in FIG. 2a, operation 205a is performed after operation 204: The first access network device sends the first request message to the first AMF device. Accordingly, the first AMF device receives the first request message sent by the first access network device. Subsequently, the first AMF device may determine whether the first AMF device supports the first network slice that is in the first request message and that the terminal requests to access. When the first AMF device supports the first network slice that is in the first request message and that the terminal requests to access, the first AMF device may determine a first radio access selection priority index corresponding to one first network slice, and send the first radio access selection priority index to the first access network device. It may be understood that when the first AMF device determines that the first AMF device supports the first network slice that is in the first request message and that the terminal requests to access, it indicates that the current tracking area supports the first network slice that is in the first request message and that the terminal requests to access. In this case, with reference to the following operations, the first radio access selection priority index sent to the terminal may be for selection of an access network device that supports the first network slice at the terminal. This is further described with reference to the following operations.

In another example, as shown in FIG. 2b, operation 205b1 is performed after operation 204: The first access network device sends the first request message to a second AMF device. The second AMF device receives the first request message from the first access network device. Operation 205b2: When the second AMF device determines that the second AMF device does not support any first network slice that is in the first request message and that the terminal requests to access, the second AMF device sends the first request message to another first AMF device supporting the first network slice that is in the first request message and that the terminal requests to access. Correspondingly, the first AMF device receives the first request message from the second AMF device, where the first request message includes the identifier of the first network slice that the terminal requests to access and the identifier of the tracking area in which the terminal is located. Subsequently, the first AMF device may determine whether the first AMF device supports the first network slice that is in the first request message and that the terminal requests to access. When the first AMF device supports the first network slice that is in the first request message and that the terminal requests to access, the first AMF device may determine the first radio access selection priority index, and send the first radio access selection priority index to the second AMF device.

In another example, as shown in FIG. 2c, operation 205c is performed after operation 204: The first access network device sends the first request message to the first AMF device. Accordingly, the first AMF device receives the first request message sent by the first access network device. Subsequently, the first AMF device may determine whether the first AMF device supports the first network slice that is in the first request message and that the terminal requests to access. When the first AMF device does not support the first network slice that is in the first request message and that the terminal requests to access but the current tracking area supports the first network slice, the first AMF device may determine the first radio access selection priority index, and send the first radio access selection priority index to the first access network device.

If the terminal is connected to a network in the current tracking area not for the first time, the core network side previously allocates a temporary identifier to the terminal, and an access network device previously accessed by the terminal stores a correspondence between the temporary identifier and an AMF device that previously serves the terminal. If the first access network device that receives the first request message in operation 204 is the access network device previously accessed by the terminal, the first access network device may send, based on the temporary identifier of the terminal, the first request message to the AMF device that serves the terminal. The AMF device may support the first network slice in the first request message in the tracking area. In this case, the AMF device may determine the first radio access selection priority index. In another case, the AMF device may not support the first network slice in the first request message in the tracking area. In this case, the AMF device may determine the first radio access selection priority index; or may send the first request message to another AMF device that supports the first network slice in the first request message, and the another AMF device that supports the first network slice in the first request message determines the first radio access selection priority index.

If the terminal is powered on or moves from a previous tracking area to the current tracking area, the terminal is connected to the network of the current tracking area for the first time. If the core network side has not allocated the temporary identifier to the terminal, the correspondence between the temporary identifier of the terminal and an AMF device does not exist on the access network device. The first access network device needs to select an AMF device for the terminal, and send the first request message to the AMF device. When selecting an AMF device, the first access network device may consider a network slice supported by each AMF device connected to the first access network device, preferentially select an AMF device that supports the first network slice included in the first request message, and send the first request message to the AMF device. The AMF device determines the first radio access selection priority index. If the first access network device determines that there is no AMF device that supports the first network slice in the first request message in the AMF devices connected to the first access network device, the first access network device sends the first request message to a default AMF device. The default AMF device may support the first network slice in the first request message. In this case, the default AMF device may determine the first radio access selection priority index. In another case, the default AMF device may not support the first network slice in the first request message. In this case, the default AMF device may determine the first radio access selection priority index; or may send the first request message to another AMF device that supports the first network slice in the first request message, and the another AMF device that supports the first network slice in the first request message determines the first radio access selection priority index.

In conclusion, in the embodiment in FIG. 2a, when the first AMF device supports the first network slice, the first AMF device may be the default AMF device, or may not be the default AMF device. In the embodiment in FIG. 2c, when the first AMF device does not support the first network slice, the first AMF device is the default AMF device. In the embodiment in FIG. 2b, the second AMF device may be the default AMF device of the first access network device, and the second AMF device does not support, in the tracking area, the first network slice that the terminal requests to access.

Operation 206: The first AMF device determines the first radio access selection priority index corresponding to the first network slice.

There may be one or more network slices that the terminal requests to access in the first request message. When a network slice that the terminal requests to access is exactly a network slice supported by the tracking area, the network slice may be referred to as the first network slice. For example, the network slices that the terminal requests to access are the S-NSSAI #1, the S-NSSAI #2, and the S-NSSAI #3. If the tracking area supports the network slice S-NSSAI #1, the first request message includes one first network slice, namely, the S-NSSAI #1. If the tracking area supports the network slices S-NSSAI #1 and S-NSSAI #3, and does not support the network slice S-NSSAI #2, the first request message includes two first network slices: the network slices S-NSSAI #1 and S-NSSAI #3.

In operation 206, the first AMF device may only need to determine the first radio access selection priority index corresponding to one first network slice.

If the first request message includes an identifier of the one first network slice that the terminal requests to access, the first AMF device determines the first radio access selection priority index corresponding to the one first network slice. If the first request message includes identifiers of a plurality of first network slices that the terminal requests to access, the first AMF device selects one first network slice from the plurality of first network slices, and determines the first radio access selection priority index corresponding to the one first network slice.

When the first AMF device selects one first network slice from the plurality of first network slices, in an example, if the first AMF device supports the plurality of first network slices, the first AMF device may preferentially select the first network slice supported by the first AMF device, or may randomly select one first network slice. In another example, the first AMF device selects one first network slice from the plurality of first network slices based on priorities of the first network slices. Generally, the first AMF device may select a network slice with a highest priority from the network slices that the terminal requests to access, to determine the first radio access selection priority index. The network slice with the highest priority may be a network slice corresponding to an identifier of a network slice at a foremost location in the first request message, or a network slice corresponding to an identifier of a network slice with a highest priority indication in the first request message.

When the first AMF device determines the first radio access selection priority index corresponding to the one first network slice, in an example, the first AMF device uses the radio access selection priority index corresponding to the one first network slice in the tracking area as the first radio access selection priority index. In another example, the first AMF device determines the first radio access selection priority index based on a radio access selection priority index respectively corresponding to each network slice group supported by the tracking area, where a first network slice group corresponding to the first radio access selection priority index includes the one first network slice. An access network device and/or an AMF device supporting the first network slice group supports each network slice in the first network slice group in the tracking area.

In another example, both the access network device and the AMF device support a plurality of network slices that the terminal subscribes to, but the terminal cannot simultaneously use all the subscribed network slices due to policy restrictions. In this case, the network slices that the terminal subscribes to are divided into several groups, and the terminal can only use a network slice in one group at a moment. When one radio access selection priority index corresponds to a plurality of network slice groups and there are a plurality of first network slices, the first AMF device may determine, from a plurality of radio access selection priority indexes based on radio access selection priority indexes respectively corresponding to a plurality of first network slice groups, a radio access selection priority index corresponding to a largest quantity of first network slice groups as the first radio access selection priority index. A slice group including the first network slice is referred to as the first network slice group. For example, if a first network slice group 1 corresponds to the radio access selection priority index #1 and the radio access selection priority index #2, a network slice group 2 corresponds to the radio access selection priority index #2, the radio access selection priority index #1 corresponds to one first network slice group, and the radio access selection priority index #2 corresponds to two network slice groups, the radio access selection priority index #2 is used as the first radio access selection priority index.

In another example, when one radio access selection priority index corresponds to a plurality of network slices and the first request message includes the plurality of first network slices, the first AMF device may determine, from the plurality of radio access selection priority indexes based on radio access selection priority indexes respectively corresponding to the plurality of first network slices, a radio access selection priority index corresponding to a largest quantity of first network slices or a largest quantity of types of first network slices as the first radio access selection priority index. For example, the first network slice S-NSSAI #1 corresponds to the radio access selection priority indexes #1, and the first network slice S-NSSAI #2 corresponds to the radio access selection priority indexes #1 and #2. The radio access selection priority index #1 corresponds to two first network slices: the network slice S-NSSAI #1 and the network slice S-NSSAI #2, and the radio access selection priority index #2 corresponds to one first network slice S-NSSAI #1. In this case, the radio access selection priority index #1 is used as the first radio access selection priority index.

In an example, as shown in FIG. 2a, operation 207a is performed after operation 206, the first AMF device sends a response message to the first access network device, where the response message includes the first radio access selection priority index corresponding to the first network slice. The response message may be a response accept message, or may be a response reject message.

In an example, as shown in FIG. 2b, operation 207b1 is performed after operation 206: The first AMF device sends a response message to the second AMF device. The second AMF device receives the response message sent by the first AMF device. Operation 207b2: The second AMF device sends the response message to the first access network device, where the response message includes the first radio access selection priority index corresponding to the first network slice. The response message may be a response accept message, or may be a response reject message.

In an example, as shown in FIG. 2c, operation 207c is performed after operation 206, the first AMF device sends a response message to the first access network device, where the response message includes the first radio access selection priority index corresponding to the first network slice. Because the first AMF device does not support the first network slice corresponding to the first radio access selection priority index, the response message is the response reject message.

In one embodiment, the first AMF device receives the first request message from the first device, and sends the response message to the first device. The first device may be the first access network device, or may be the second AMF device.

Operation 208: After receiving the first radio access selection priority index, the first access network device may determine, based on the correspondence that is between the radio access selection priority index and the cell/frequency selection and reselection parameter and that is configured in operation 201, a cell/frequency selection and reselection parameter corresponding to the first radio access selection priority index. Further, the first access network device sends the response message to the terminal, where the response message includes the cell/frequency selection and reselection parameter corresponding to the first radio access selection priority index.

After receiving the cell/frequency selection and reselection parameter sent by the first access network device, the terminal may perform cell or frequency reselection based on the cell/frequency selection and reselection parameter, and camp on a second access network device (gNB 2) that supports the first network slice. Subsequently, the terminal may normally establish a session connection and transmit service data in the first network slice via the second access network device.

In one embodiment, in the example in FIG. 2a or FIG. 2b, before operation 206 is performed, any one of operation 209, operation 210, operation 211, and operation 212 may be performed first.

In one embodiment, operation 209: The first AMF device obtains subscription information of the terminal from a UDM device based on a terminal user identifier, where the subscription information includes identifiers of network slices that the terminal subscribes to, for example, the S-NSSAI #1, the S-NSSAI #2, and the S-NSSAI #3. The first AMF device may alternatively determine whether the network slice that the terminal requests to access is the network slice to which the user subscribes. If the network slice that the terminal requests to access is not the network slice to which the user subscribes, the procedure ends. The operation of determining, by the first AMF device, whether the network slice that the terminal requests to access is the network slice to which the user subscribes may alternatively be performed in operation 211. In addition, the first AMF device may alternatively determine, based on the subscription information of the terminal, whether authentication and authorization need to be performed on the terminal by an authentication service function (AUSF) device, that is, whether to perform the following operation 210.

In one embodiment, operation 210: If the network slice to which the terminal subscribes carries information that third-party authentication is required, further perform authentication and authorization on the terminal by the AUSF and a third-party authentication, authorization, and accounting (AAA) server to determine whether the terminal has permission to access the requested network slice. If the terminal has no permission to access the requested network slice, the procedure ends. If the terminal has permission to access the requested network slice, the next operation is performed.

In one embodiment, operation 211: In one embodiment, the first AMF device may request a network slice selection function NSSF device to perform network slice selection, or the first AMF device itself completes the network slice selection. If the terminal currently roams to a visited network, the AMF device may further obtain a mapping relationship between a network slice of the current visited network and a network slice of a home network, that is, mapping S-NSSAI of the network slice to which the terminal subscribes in the current visited network. The first AMF device may alternatively determine whether the network slice that the terminal requests to access is the network slice to which the user subscribes. The first AMF device or the NSSF device determines, based on the S-NSSAI subscribed to by the terminal, the requested NSSAI, and the tracking area in which the terminal is currently located, one or more network slices that the terminal is currently allowed to access, that is, allowed NSSAI.

In one embodiment, operation 212: The first AMF device may request a PCF device to establish a mobility and access management policy association for the terminal, and obtain service restriction area information of the terminal from the PCF device. The first AMF device may determine, based on the service restriction area information, whether the terminal is allowed to access the first network slice at a current location. If the terminal is not allowed to access the first network slice at the current location, the procedure ends. If the terminal is allowed to access the first network slice at the current location, operation 206 is performed.

The following describes another communication process.

The first AMF device receives the first request message, where the first request message includes the identifier of the first network slice that the terminal requests to access and the identifier of the tracking area in which the terminal is located. For this process, refer to the foregoing operation 205a, operation 205b2, and operation 205c. Details are not described herein again.

The first AMF device sends the response message when the first AMF device determines that the tracking area supports the first network slice, where the response message may include the first radio access selection priority index corresponding to the first network slice, where the first radio access selection priority index is used by the terminal to select the access network device that supports the first network slice. For this process, refer to the foregoing operation 207a, operation 207b1, and operation 207c. Details are not described herein again.

The first radio access selection priority index is a radio access selection priority index corresponding to the network slice (allowed NSSAI) that allows the terminal to access. In one embodiment, when determining the allowed NSSAI for the terminal, the first AMF device refers to a network slice supported by the current cell and a network slice supported by the neighboring cell, and the tracking area in which the terminal is located includes at least the current cell and the neighboring cell of the current cell. Therefore, the tracking area in which the terminal is located can support the allowed NSSAI. This may be understood as that in a process of determining the allowed NSSAI, the first AMF device determines that the tracking area can support the first network slice. This solution is further described with reference to FIG. 7 below.

Further, for receiving the first request message, the first AMF device may receive the first request message from the first device. The first device is the first access network device in operation 205a and operation 205c, or the second AMF device in operation 205b2.

Further, for sending the response message, the first AMF device may send the response message to the first device, where the first device is the first access network device in operation 207a and operation 207c, or the second AMF device in operation 207b1.

Further, the first AMF device may determine that the first AMF device supports the first network slice. Alternatively, when the first AMF device is the default AMF device, the first AMF device may alternatively determine that the first AMF device does not support the first network slice. In addition, in the two cases, the first AMF device may alternatively determine the first radio access selection priority index. For this process, refer to the foregoing operation 206. For example, the first radio access selection priority index is determined in the following manner. In a manner, if the first request message includes an identifier of the one first network slice that the terminal requests to access, the first AMF device determines the first radio access selection priority index corresponding to the one first network slice. In another manner, if the first request message includes identifiers of a plurality of first network slices that the terminal requests to access, the first AMF device selects one first network slice from the plurality of first network slices, and determines the first radio access selection priority index corresponding to the one first network slice.

Further, when the first AMF device selects one first network slice from the plurality of first network slices, it may be that the first AMF device selects one first network slice from the plurality of first network slices based on priorities of the first network slices. For this process, refer to the descriptions in operation 206. Details are not described herein again.

Further, the first AMF device determines the first radio access selection priority index corresponding to the one first network slice, the first AMF device uses a radio access selection priority index corresponding to the one first network slice in the tracking area as the first radio access selection priority index; or the first AMF device determines the first radio access selection priority index based on a radio access selection priority index respectively corresponding to each network slice group supported by the tracking area, where a first network slice group corresponding to the first radio access selection priority index includes the first network slice. For this process, refer to the descriptions in operation 206. Details are not described herein again.

In addition, the first AMF device may alternatively receive configuration information, where the configuration information includes the identifier of the network slice supported by the tracking area and the radio access selection priority index respectively corresponding to at least one network slice supported by the tracking area; or the configuration information includes an identifier of a network slice group supported by the tracking area and the radio access selection priority index respectively corresponding to at least one network slice group supported by the tracking area. For this process, refer to the descriptions in operation 202. Details are not described herein again.

The following describes another communication process.

The default AMF device of the first access network device receives the first request message from the first access network device. The first request message may include an identifier of at least one network slice that the terminal requests to access and an identifier of a tracking area in which the terminal is located. For this process, refer to operation 205b1. The default AMF device of the first access network device may be the second AMF device in operation 205b1. Details are not described herein again.

The default AMF device sends the first request message to the first AMF device when the default AMF device determines that the default AMF device does not support, in the tracking area, any one of the at least one network slice that the terminal requests to access. The first AMF device supports, in the tracking area, at least one of the at least one network slice that the terminal requests to access. For this process, refer to the foregoing operation 205b2. Details are not described herein again.

Further, the default AMF device receives the response message of the first request message from the first AMF device, and sends the response message to the first access network device, where the response message includes the first radio access selection priority index corresponding to the first network slice. For this process, refer to the foregoing operation 207b1 and operation 207b2. Details are not described herein again.

Figure 7:
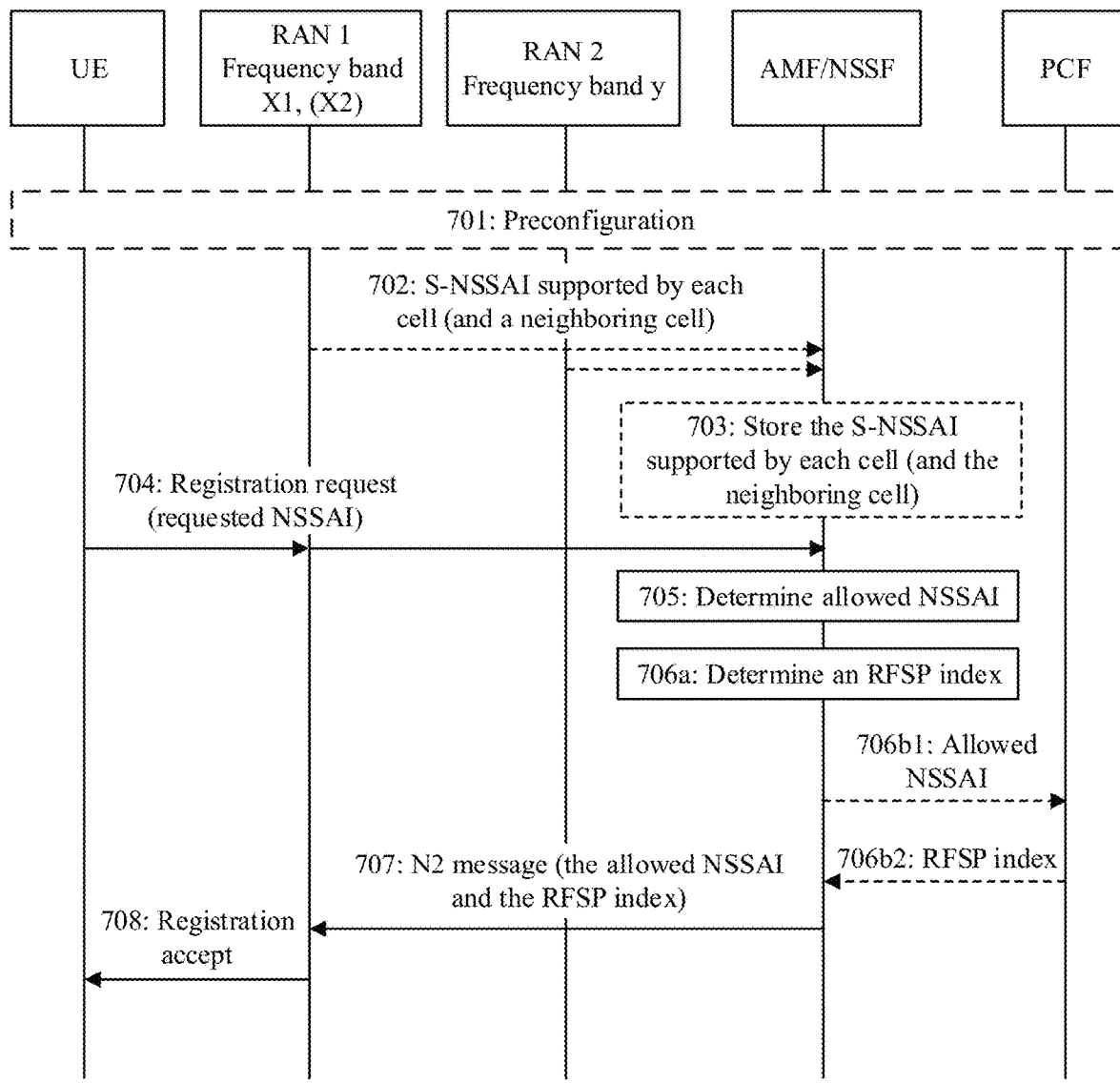
FIG. 7 is a schematic diagram of another communication process according to an embodiment of this application.

As shown in FIG. 7, this application further provides a communication method. For example, the method may include the following operations.

Operation 701: An OAM entity of a management plane may preconfigure for each access network device.

For example, the OAM entity configures, for each access network device, a relationship between a frequency and a cell identifier, and S-NSSAI supported by each cell. When an access network device may work on a plurality of frequencies (for example, support different network slices by using a plurality of different frequencies), the access network device includes a plurality of cells, and each cell corresponds to a frequency. For example, the plurality of cells may be inter-frequency co-coverage cells.

For example, information preconfigured by an access network device 1 (referred to as a RAN 1 for short later, as shown in FIG. 7) is shown in Table 1, and information preconfigured by an access network device 2 (referred to as a RAN 2 for short later, as shown in FIG. 7) is shown in Table 2.

TABLE 1

| Cell identifier | Frequency | Supported slice |
| --- | --- | --- |
| ID 1 | X1 | S-NSSAI 1 |
| ID 2 | X2 | S-NSSAI 2 |

TABLE 2

| Cell identifier | Frequency | Supported slice |
| --- | --- | --- |
| ID 3 | Y | S-NSSAI 3 |

Content in Table 1 identifies that a frequency of a cell whose cell identifier is ID 1 in the RAN 1 is X1, and can support a slice of an S-NSSAI 1 type. A frequency of a cell whose cell identifier is ID 2 in the RAN 1 is X2, and can support a slice of an S-NSSAI 2 type. Content in Table 2 identifies that a frequency of a cell whose cell identifier is ID 3 in the RAN 2 is Y, and can support a slice of an S-NSSAI 3 type.

In one embodiment, the OAM entity further configures, for the access network device, an identifier of a neighboring cell, a relationship between a frequency and a cell identifier of the neighboring cell, and the S-NSSAI supported by each cell. In one embodiment, each access network device exchanges, with an access network device of the neighboring cell through an Xn interface, the S-NSSAI supported by each cell. In other words, the RAN 1 may also obtain the information in Table 2 in any one of the manners.

Each frequency band corresponds to a particular RFSP index. In one embodiment, for each access network device, a mapping relationship between a radio parameter and an RFSP index may be alternatively configured. Alternatively, an AMF or a PCF (or a UDR associated with the PCF) configures one or more RFSP indexes corresponding to each S-NSSAI.

Operation 702: The access network device reports, to the AMF or an NSSF by using a cell as a granularity, the S-NSSAI supported by each cell.

In one embodiment, the access network device not only reports the S-NSSAI supported by each cell of the access network device, but also reports S-NSSAI supported by the neighboring cell of the access network device or the identifier of the neighboring cell of the access network device.

Operation 703: The AMF or the NSSF stores the S-NSSAI supported by each cell, for example, as shown in Table 3.

TABLE 3

| Cell identifier | Frequency | Supported slice |
| --- | --- | --- |
| ID 1 | X1 | S-NSSAI 1 |
| ID 2 | X2 | S-NSSAI 2 |
| ID 3 | Y | S-NSSAI 3 |

Operation 701 to operation 703 are optional operations. The AMF or the NSSF may alternatively obtain the S-NSSAI supported by each cell in another manner. This is not limited herein in this application.

Alternatively, the AMF or the NSSF may directly obtain, by using the foregoing operation 702, S-NSSAI supported by the neighboring cell of each cell, or determine, based on the neighboring relationship that is of each cell and that is obtained in operation 702 and with reference to Table 3, the S-NSSAI supported by the neighboring cell of each cell.

Operation 704: UE sends a registration request to the AMF through the RAN 1, where the registration request includes requested NSSAI.

Operation 705: The AMF or the NSSF determines allowed NSSAI.

In one embodiment, when determining the allowed NSSAI, the AMF or the NSSF considers the requested NSSAI and network slices supported by a current cell and the neighboring cell.

In one embodiment, the AMF stores the S-NSSAI supported by each cell in operation 703, and the AMF determines the allowed NSSAI. For example, the AMF considers S-NSSAI supported by the current cell and the neighboring cell of the UE, and deletes, from the requested NSSAI, S-NSSAI that is not supported by both the current cell and the neighboring cell. In other words, the allowed NSSAI determined by the AMF is an intersection set of the requested NSSAI and the S-NSSAI supported by the current cell, or an intersection set of the requested NSSAI and the S-NSSAI supported by the neighboring cell.

In one embodiment, the AMF stores the S-NSSAI supported by each cell in the foregoing operation 703. The AMF sends, to the NSSF, the requested NSSAI and the S-NSSAI supported by the current cell and the neighboring cell, and the NSSF determines the allowed NSSAI and sends the allowed NSSAI to the AMF. For example, the NSSF considers S-NSSAI supported by the current cell and the neighboring cell of the UE, and deletes, from the requested NSSAI, S-NSSAI that is not supported by both the current cell and the neighboring cell. In other words, the allowed NSSAI determined by the NSSF is an intersection set of the requested NSSAI and the S-NSSAI supported by the current cell, or an intersection set of the requested NSSAI and the S-NSSAI supported by the neighboring cell.

In one embodiment, the NSSF stores the S-NSSAI supported by each cell in the foregoing operation 703, the AMF sends the requested NSSAI to the NSSF, and the NSSF determines the allowed NSSAI and sends the allowed NSSAI to the AMF. For example, the NSSF considers S-NSSAI supported by the current cell and the neighboring cell of the UE, and deletes, from the requested NSSAI, S-NSSAI that is not supported by both the current cell and the neighboring cell. In other words, the allowed NSSAI determined by the NSSF is an intersection set of the requested NSSAI and the S-NSSAI supported by the current cell, or an intersection set of the requested NSSAI and the S-NSSAI supported by the neighboring cell.

For example, the requested NSSAI includes S-NSSAI 2, S-NSSAI 3, and S-NSSAI 4. As shown in Table 3, because the network slices supported by the current cell and the neighboring cell include the S-NSSAI 2 and the S-NSSAI 3, the determined allowed NSSAI includes the S-NSSAI 2 and the S-NSSAI 3.

In one embodiment, when the UE requests to access some network slices that do not have a common frequency band, to determine the allowed NSSAI, the AMF or the NSSF needs to delete some S-NSSAI that cannot be simultaneously supported by one cell. There should be a consensus between the AMF or NSSF and the UE on a priority order of the requested NSSAI. For example, each S-NSSAI in the requested NSSAI carries a priority identifier, or an order in which the S-NSSAI appears in a requested NSSAI list also indicates a priority order of the S-NSSAI. Based on priorities of the S-NSSAI in the requested NSSAI, the AMF or NSSF retains only S-NSSAI that can be supported simultaneously in the same cell as S-NSSAI with a highest priority in the requested NSSAI in the allowed NSSAI. For example, because the S-NSSAI 2 and the S-NSSAI 3 cannot be supported by one cell at the same time, if a priority of the S-NSSAI 2 is higher than that of the S-NSSAI 3, the allowed NSSAI may include only the S-NSSAI 2; or if a priority of the S-NSSAI 2 is lower than that of the S-NSSAI 3, the allowed NSSAI may include only the S-NSSAI 3.

After determining the allowed NSSAI, the AMF obtains an RFSP index corresponding to the allowed NSSAI. For example, this may be implemented by using 706a, or 706b1 and 706b2.

Operation 706a: The AMF determines the RFSP index corresponding to the allowed NSSAI. For example, the AMF configures an RFSP index corresponding to each S-NSSAI in the foregoing operation 701, and the AMF determines the RFSP index based on the allowed NSSAI.

Operation 706b1: The AMF sends the allowed NSSAI to the PCF, and the PCF determines the RFSP index based on the allowed NSSAI, and sends the RFSP index to the AMF by using operation 706b2.

For example, if the RFSP index corresponding to each S-NSSAI is configured in the PCF or UDR, or in the cell where the UE is currently located or in each neighboring cell of the cell where the UE is currently located, the AMF finds that a plurality of cells can support all S-NSSAI in the allowed NSSAI, and the AMF sends a message in operation 706b1 to request the RFSP index, where the message carries the allowed NSSAI. The PCF determines the RFSP index based on the allowed NSSAI and an optional policy, and then sends the RFSP index to the AMF in operation 706b2.

Operation 707: The AMF accepts the registration request of the UE, transfers the RFSP index to the RAN 1 by using an N2 message, where the N2 message carries the allowed NSSAI.

Operation 708: The RAN 1 sends a registration accept to the UE, and provides a corresponding radio parameter to the UE based on the RFSP index. The UE reselects a cell that supports the allowed NSSAI based on the radio parameter.

For example, if the allowed NSSAI includes the S-NSSAI 2, the RAN 1 receives, from the AMF, an RFSP index 2 corresponding to the S-NSSAI 2, and provides, for the UE, a radio parameter corresponding to the RFSP index 2. After receiving the radio parameter, the UE accesses a cell whose cell identifier is ID 2 in the RAN 1 through a frequency X2. The cell supports a network slice corresponding to the S-NSSAI 2. If the allowed NSSAI includes the S-NSSAI 3, the RAN 1 receives, from the AMF, an RFSP index 3 corresponding to the S-NSSAI 3, and provides, for the UE, a radio parameter corresponding to the RFSP index 3. After receiving the radio parameter, the UE accesses a cell whose cell identifier is ID 3 in the RAN 2 through a frequency Y. The cell supports a network slice corresponding to the S-NSSAI 3.

According to the foregoing method, because the S-NSSAI included in the allowed NSSAI determined for the UE may be supported by the cell in which the UE is currently located or a neighboring cell of the cell in which the UE is currently located, the access network device may help, based on the RFSP index, the UE reselect a cell that supports the allowed NSSAI, and normally access these network slices.

With reference to the descriptions in FIG. 7, this application provides another communication method. The method includes:

The access and mobility management function AMF device receives a request message from a first access network device, where the request message includes information about a network slice that a terminal requests to access (refer to the descriptions of operation 704 in FIG. 7).

The AMF device determines information about a network slice allowed to be accessed by the terminal, where the network slice allowed to be accessed by the terminal is a network slice supported by a current cell accessed by the terminal or a neighboring cell of the current cell in the network slice that the terminal requests to access (refer to the descriptions of operation 705 in FIG. 7).

The AMF device obtains a radio access selection priority index corresponding to the network slice allowed to be accessed by the terminal (refer to the descriptions of operation 706a, or operations 706b1 and 706b2 in FIG. 7).

The AMF device sends a response message to the first access network device, where the response message includes the radio access selection priority index (refer to the descriptions of operation 707 in FIG. 7).

For example, the radio access selection priority index is used by the terminal to access a cell that supports the network slice allowed to be accessed by the terminal, the cell is served by the first access network device (the RAN 1 in FIG. 7) or a second access network device (the RAN 2 in FIG. 7), and the second access network device serves the neighboring cell of the current cell accessed by the terminal.

In one embodiment, the method further includes: The AMF device receives, from the first access network device, identification information of at least one cell and information about a network slice supported by each of the at least one cell, where the at least one cell includes at least one cell served by the first access network device. Further, in one embodiment, the at least one cell further includes at least one cell that is served by the second access network device and that has a neighboring relationship with the cell served by the first access network device. For this, refer to the descriptions of operation 702 in FIG. 7. Details are not described herein again.

Figure 4:
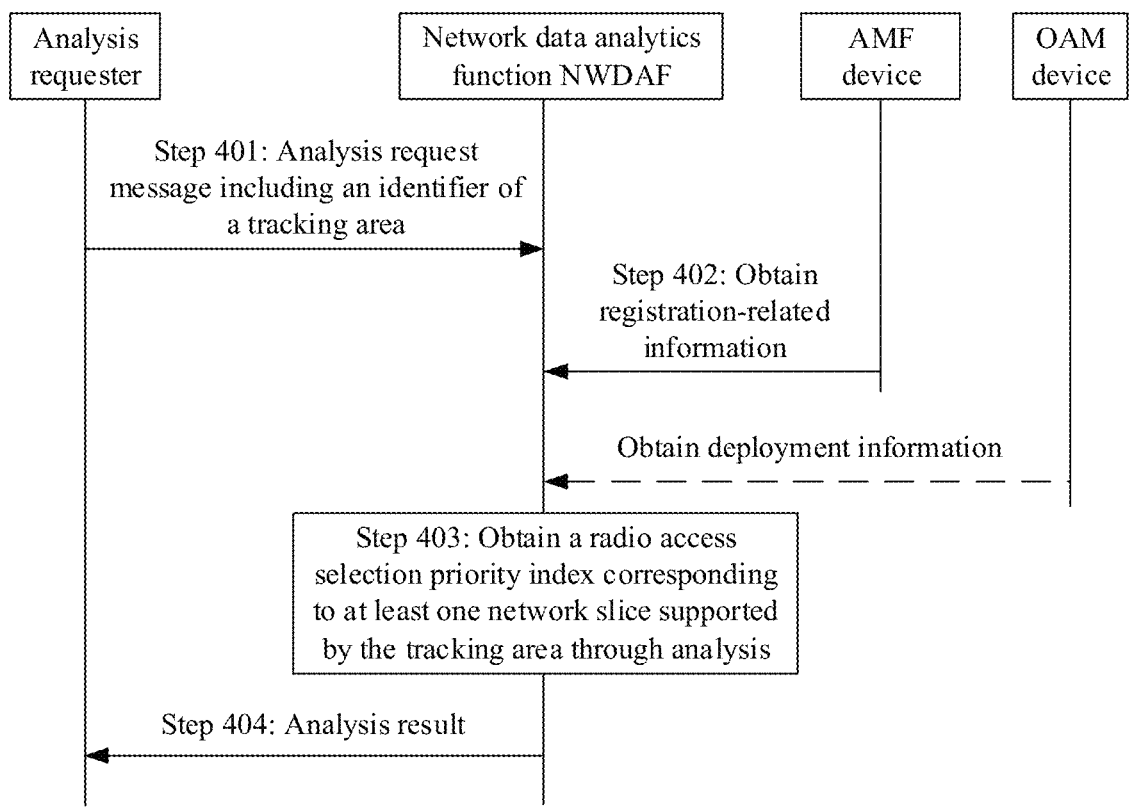

Next, as shown in FIG. 4, another communication method is provided. A network data analytics function NWDAF device collects registration-related information, may further collect device deployment information in a tracking area, and analyzes a radio access selection priority index corresponding to each network slice in the tracking area.

Operation 401: The network data analytics function NWDAF device receives an analysis request message from an analysis requester, where the analysis request message includes an identifier of the tracking area.

The analysis requester may be an AMF device, a PCF device or another device.

Operation 402: The NWDAF device obtains a plurality of pieces of registration-related information from a plurality of AMF devices in the tracking area, where each piece of registration-related information includes an identifier of a network slice included in a registration request message sent by a terminal, whether a response message of the registration request message is accepted, and a radio access selection priority index included in the response message of the registration request message.

Operation 403: The NWDAF device obtains, through analysis based on the plurality of pieces of obtained registration-related information, a radio access selection priority index corresponding to at least one network slice supported by the tracking area.

In an example, the NWDAF device may further obtain the device deployment information in the tracking area from an OAM device. The device deployment information includes a connection relationship between an access device and an AMF device, a connection relationship between AMF devices, a network slice supported by each of at least one access device, and a network slice supported by each of at least one AMF device. The registration-related information obtained by the NWDAF device from the AMF device may alternatively include an identifier of an access network device at which the registration request message arrives and an identifier of an AMF device that processes the registration request message. When the NWDAF device obtains, through analysis based on the plurality of pieces of obtained registration-related information, the radio access selection priority index corresponding to the at least one network slice, it may be that the NWDAF device obtains, through analysis based on the obtained device deployment information in the tracking area and the plurality of pieces of obtained registration-related information, the radio access selection priority index corresponding to the at least one network slice.

In an example, the registration-related information may alternatively include an identifier of at least one network slice allowed to be accessed. When the NWDAF device obtains, through analysis based on the plurality of pieces of obtained registration-related information, the radio access selection priority index corresponding to the at least one network slice, it may be that the NWDAF device obtains, through analysis based on the plurality of pieces of obtained registration-related information, a radio access selection priority index with a highest access success rate corresponding to the at least one network slice. The registration-related information may alternatively include a cell identifier CGI in which the terminal is located when the registration request is initiated, subscribed S-NSSAI of the terminal, allowed NSSAI allowed to be accessed, rejected S-NSSAI, an authorized RFSP index, service access restriction information of the terminal, whether registration succeeds, and the like.

For a newly deployed network slice, an operator may use a tool or a test terminal to initiate a test from each location of a TA by using each available frequency band of each available access network device. The NWDAF may collect, from the AMF device, the foregoing data for testing these network slices. After the network slice is formally used, the NWDAF may also collect the foregoing data of a formal user terminal from the AMF device. The NWDAF may perform association analysis based on the foregoing information, to obtain, through analysis, a network slice that can be successfully accessed by the terminal when the terminal registers with a particular AMF device by using a particular access network device. Through analysis on the foregoing data of a large quantity of terminals, a radio access selection priority index with a highest access success rate corresponding to the at least one network slice may be obtained.

Operation 404: The NWDAF device provides, for the analysis requester, the radio access selection priority index corresponding to the at least one network slice supported by the tracking area as an analysis result.

The analysis requester may subscribe to the analysis result in the tracking area in a subscription notification manner. For example, the AMF device first sends a subscription request to the NWDAF device, and if the NWDAF device accepts the subscription request, the NWDAF device returns a subscription success response. Subsequently, after completing the analysis result, the NWDAF device sends the analysis result to the AMF device by using a notification message. The analysis requester may also obtain the analysis result in the tracking area in a request response manner. For example, the AMF device requests the NWDAF device to return the analysis result, and the NWDAF device returns the analysis result via a response message.

It should be noted that the NWDAF is considered as an independent device or network element entity above, or the NWDAF may be a microservice module of a default AMF device, an NSSF device, or a PCF device.

The foregoing describes the communication method in embodiments of this application, and the following describes a communication apparatus in embodiments of this application. The method and the apparatus are based on a same technical idea. The method and the apparatus have similar principles for resolving problems. Therefore, for implementations of the apparatus and the method, refer to each other, and details of repeated parts are not described again.

Figure 5:
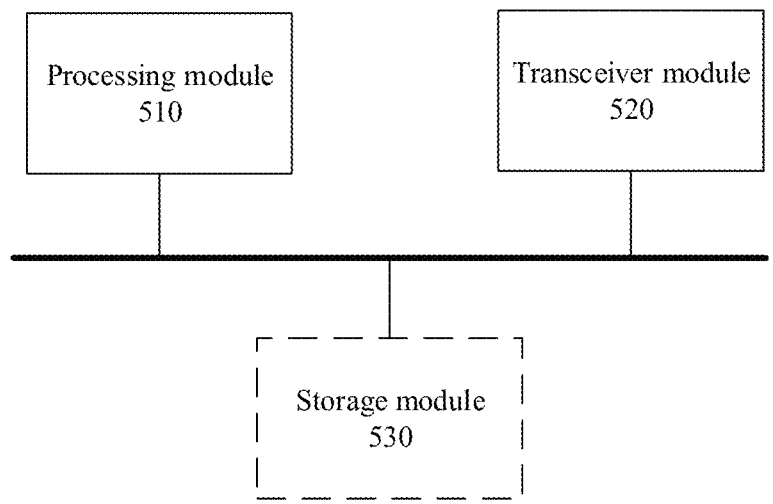
FIG. 5 and FIG. 6 each show a communication apparatus according to an embodiment of this application.

Based on a same technical concept as the foregoing communication method, as shown in FIG. 5, a communication apparatus 500 is provided. The apparatus 500 can perform the operations performed by the AMF device in the method in FIG. 2a, FIG. 2b, FIG. 2c, or FIG. 7. The apparatus 500 may be an AMF device, or may be a chip applied to an AMF device. The apparatus 500 may include a transceiver module 520 and a processing module 510. In one embodiment, the apparatus 500 further includes a storage module 530. The processing module 510 may be separately connected to the storage module 530 and the transceiver module 520, or the storage module 530 may be connected to the transceiver module 520.

In an example, the transceiver module 520 is configured to receive a first request message, where the first request message includes an identifier of a first network slice that a terminal requests to access and an identifier of a tracking area in which the terminal is located. The processing module 510 is configured to: when determining that the tracking area supports the first network slice, send a response message using the transceiver module, where the response message includes a first radio access selection priority index corresponding to the first network slice, where the first radio access selection priority index is for selection of an access network device that supports the first network slice at the terminal.

In an example, when receiving the first request message, the transceiver module 520 is configured to receive the first request message from a first device; and when sending the response message, the transceiver module 520 is configured to send the response message to the first device, where the first device is a first access network device or a second AMF device.

In an example, the processing module 510 is further configured to determine that the apparatus supports the first network slice.

In an example, the apparatus is a default AMF device, and the processing module 510 is further configured to determine that the apparatus does not support the first network slice.

In an example, the processing module 510 is further configured to: if the first request message includes an identifier of one first network slice that the terminal requests to access, determine the first radio access selection priority index corresponding to the one first network slice; or if the first request message includes identifiers of a plurality of first network slices that the terminal requests to access, select one first network slice from the plurality of first network slices, and determine the first radio access selection priority index corresponding to the one first network slice.

In an example, when selecting one first network slice from the plurality of first network slices, the processing module 510 is configured to select one first network slice from the plurality of first network slices based on priorities of the first network slices.

In an example, when determining the first radio access selection priority index corresponding to the one first network slice, the processing module 510 is configured to: use a radio access selection priority index corresponding to the one first network slice in the tracking area as the first radio access selection priority index; or determine the first radio access selection priority index based on a radio access selection priority index respectively corresponding to each network slice group supported by the tracking area, where a first network slice group corresponding to the first radio access selection priority index includes the one first network slice.

In an example, the transceiver module 520 is further configured to receive configuration information, where the configuration information includes an identifier of a network slice supported by the tracking area and a radio access selection priority index respectively corresponding to at least one network slice supported by the tracking area; or the configuration information includes an identifier of a network slice group supported by the tracking area and a radio access selection priority index respectively corresponding to at least one network slice group supported by the tracking area.

In one embodiment, the transceiver module 520 is configured to receive a request message from a first access network device, where the request message includes information about a network slice that a terminal requests to access. The processing module 510 is configured to determine information about a network slice allowed to be accessed by the terminal, where the network slice allowed to be accessed by the terminal is a network slice supported by a current cell accessed by the terminal or a neighboring cell of the current cell in the network slice that the terminal requests to access, and obtain a radio access selection priority index corresponding to the network slice allowed to be accessed by the terminal. The transceiver module 520 is further configured to send a response message to the first access network device, where the response message includes the radio access selection priority index.

For example, the processing module 510 is configured to determine the radio access selection priority index corresponding to the network slice allowed to be accessed by the terminal; or the processing module 510 is configured to: send, to a policy control function PCF device using the transceiver module 520, the information about the network slice allowed to be accessed by the terminal; and receive, from the PCF device, the radio access selection priority index corresponding to the network slice allowed to be accessed by the terminal.

For example, the radio access selection priority index is used by the terminal to access a cell that supports the network slice allowed to be accessed by the terminal, the cell is served by the first access network device or a second access network device, and the second access network device serves the neighboring cell of the current cell accessed by the terminal.

In an example, the transceiver module 520 is further configured to receive, from the first access network device, identification information of at least one cell and information about a network slice supported by each of the at least one cell, where the at least one cell includes at least one cell served by the first access network device. In one embodiment, the at least one cell further includes at least one cell that is served by the second access network device and that has a neighboring relationship with the cell served by the first access network device.

In an example, the storage module 530 is configured to store the configuration information. Alternatively, for example, the storage module 530 is configured to store the identification information of the at least one cell and the information about the network slice supported by each of the at least one cell that are received from the first access network device.

The storage module 530 may include one or more memories. The memory may be a component configured to store a program or data in one or more devices or circuits. The storage module 530 may store computer-executable instructions of methods on a terminal, an access gateway, an AMF network element, and an SMF network element side, so that the processing module 510 performs the methods in the foregoing embodiments. The storage module 530 may be a register, a cache, a RAM, or the like. The storage module 530 may be integrated with the processing module 510. The storage module 530 may be a ROM or another type of static storage device that can store static information and instructions, and the storage module 530 may be independent of the processing module 510.

The transceiver module 520 may be an input/output interface, a pin, a circuit, or the like.

Figure 6:
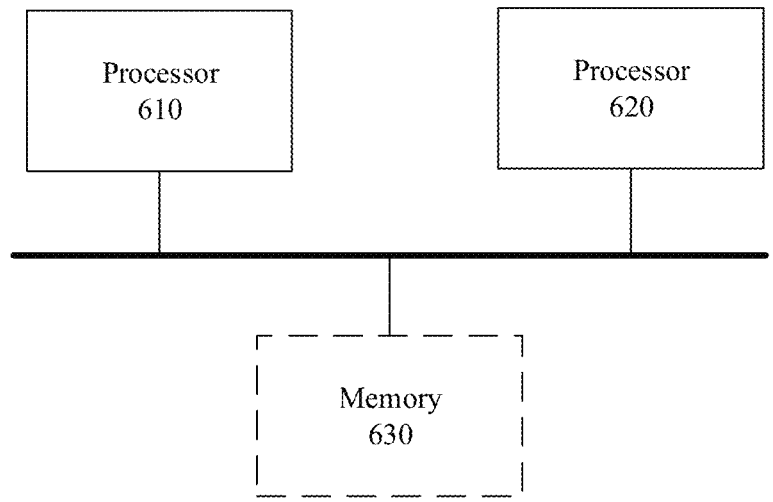

FIG. 6 is a schematic block diagram of a communication apparatus 600 according to an embodiment of this application. It should be understood that the apparatus 600 can perform operations performed by an AMF device in the method in FIG. 2a, FIG. 2b, FIG. 2c, or FIG. 7. The apparatus 600 includes a processor 610 and a transceiver 620. In one embodiment, the apparatus 600 further includes a memory 630. The transceiver may be configured to receive program instructions and transmit the program instructions to the processor, or the transceiver may be configured to perform communication interaction between the apparatus and another communication device, for example, exchange control signaling and/or service data. The transceiver may be a code and/or data read/write transceiver, or the transceiver may be a signal transmission transceiver between a communication processor and a transceiver. The processor 610 and the memory 630 are electrically coupled.

For example, the memory 630 is configured to store a computer program. The processor 610 may be configured to invoke the computer program or instructions stored in the memory, to perform the foregoing communication method, or perform the foregoing communication method by using the transceiver 620.

In FIG. 5, the processing module 510 may be implemented by using the processor 610, the transceiver module 520 may be implemented by using the transceiver 620, and the storage module 530 may be implemented by using the memory 630.

In an example, the transceiver 620 is configured to receive a first request message, where the first request message includes an identifier of a first network slice that a terminal requests to access and an identifier of a tracking area in which the terminal is located. The processor 610 is configured to: when determining that the tracking area supports the first network slice, send a response message using the transceiver module, where the response message includes a first radio access selection priority index corresponding to the first network slice, where the first radio access selection priority index is for selection of an access network device that supports the first network slice at the terminal.

In an example, when receiving the first request message, the transceiver 620 is configured to receive the first request message from a first device; and when sending the response message, the transceiver 620 is configured to send the response message to the first device, where the first device is a first access network device or a second AMF device.

In an example, the processor 610 is further configured to determine that the apparatus supports the first network slice.

In an example, the apparatus is a default AMF device, and the processor 610 is further configured to determine that the apparatus does not support the first network slice.

In an example, the processor 610 is further configured to: if the first request message includes an identifier of one first network slice that the terminal requests to access, determine the first radio access selection priority index corresponding to the one first network slice; or if the first request message includes identifiers of a plurality of first network slices that the terminal requests to access, select one first network slice from the plurality of first network slices, and determine the first radio access selection priority index corresponding to the one first network slice.

In an example, when selecting one first network slice from the plurality of first network slices, the processor 610 is configured to select one first network slice from the plurality of first network slices based on priorities of the first network slices.

In an example, when determining the first radio access selection priority index corresponding to the one first network slice, the processor 610 is configured to use a radio access selection priority index corresponding to the one first network slice in the tracking area as the first radio access selection priority index; or determine the first radio access selection priority index based on a radio access selection priority index respectively corresponding to each network slice group supported by the tracking area, where a first network slice group corresponding to the first radio access selection priority index includes the one first network slice.

In an example, the transceiver 620 is further configured to receive configuration information, where the configuration information includes an identifier of a network slice supported by the tracking area and a radio access selection priority index respectively corresponding to at least one network slice supported by the tracking area; or the configuration information includes an identifier of a network slice group supported by the tracking area and a radio access selection priority index respectively corresponding to at least one network slice group supported by the tracking area.

In one embodiment, the transceiver 620 is configured to receive a request message from a first access network device, where the request message includes information about a network slice that the terminal requests to access. The processor 610 is configured to determine information about a network slice allowed to be accessed by the terminal, where the network slice allowed to be accessed by the terminal is a network slice supported by a current cell accessed by the terminal or a neighboring cell of the current cell in the network slice that the terminal requests to access, and obtain a radio access selection priority index corresponding to the network slice allowed to be accessed by the terminal. The transceiver 620 is further configured to send a response message to the first access network device, where the response message includes the radio access selection priority index.

For example, the processor 610 is configured to determine the radio access selection priority index corresponding to the network slice allowed to be accessed by the terminal; or the processor 610 is configured to: send, to a policy control function PCF device by using the transceiver 620, the information about the network slice allowed to be accessed by the terminal; and receive, from the PCF device, the radio access selection priority index corresponding to the network slice allowed to be accessed by the terminal.

For example, the radio access selection priority index is used by the terminal to access a cell that supports the network slice allowed to be accessed by the terminal, the cell is served by the first access network device or a second access network device, and the second access network device serves the neighboring cell of the current cell accessed by the terminal.

In an example, the transceiver 620 is further configured to receive, from the first access network device, identification information of at least one cell and information about a network slice supported by each of the at least one cell, where the at least one cell includes at least one cell served by the first access network device. In one embodiment, the at least one cell further includes at least one cell that is served by the second access network device and that has a neighboring relationship with the cell served by the first access network device.

In an example, the memory 630 is configured to store the configuration information. Alternatively, for example, the memory 630 is configured to store the identification information of the at least one cell and the information about the network slice supported by each of the at least one cell that are received from the first access network device.

The foregoing processor may be a central processing unit (CPU), a network processor (NP), or a combination of the CPU and the NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL) and another programmable logic device, a discrete gate or a transistor logic device, a discrete hardware component, or the like, or any combination thereof. The general-purpose processor may be a microprocessor, or the processor may be any conventional processor or the like.

It may be further understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory described in this application is intended to include but is not limited to these memories and any memory of another proper type.

The transceiver apparatus, the interface circuit, or the transceiver in embodiments of this application may include a separate transmitter and/or a separate receiver, or the transmitter and the receiver may be integrated. The transceiver apparatus, the interface circuit, or the transceiver may work under an indication of a corresponding processor. In one embodiment, the transmitter may be corresponding to a transmitter in a physical device, and the receiver may be corresponding to a receiver in a physical device.

An embodiment of this application further provides a computer storage medium that stores a computer program. When the computer program is executed by a computer, the computer may be enabled to perform the foregoing communication method.

An embodiment of this application further provides a computer program product including instructions. When the computer program product runs on a computer, the computer may be enabled to perform the communication method provided above.

An embodiment of this application further provides a communication system. The communication system includes a first AMF device and a first access network device that perform the foregoing communication method, and may further include a second AMF device.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to work in a particular manner, so that the instructions stored in the computer-readable memory generate an artifact that includes an instruction apparatus. The instruction apparatus implements a particular function in one or more processes in the flowcharts and/or in one or more blocks in the block diagrams.

These computer program instructions may alternatively be loaded onto the computer or another programmable data processing device, so that a series of operation operations are performed on the computer or another programmable device to generate computer-implemented processing, and instructions executed on the computer or the another programmable device provide operations for implementing a function specified in one or more procedures in the flowchart and/or one or more blocks in the block diagram.

Although some preferred embodiments of this application have been described, a person skilled in the art can make changes and modifications to these embodiments once the person skilled in the art learns the basic inventive concept. Therefore, the following claims are intended to be construed as to cover the preferred embodiments and all changes and modifications falling within the scope of this application.

Clearly, a person skilled in the art can make various modifications and variations to embodiments of this application without departing from the spirit and scope of embodiments of this application. In this way, this application is intended to cover these modifications and variations to embodiments of this application provided that they fall within the scope of protection defined by the following claims and their equivalent technologies of this application.

What is claimed is:

1. A communication method comprising:
receiving, by a first access and mobility management function (AMF) device, a first request message, wherein the first request message comprises identifiers of a plurality of first network slices that a terminal requests to access and an identifier of a tracking area in which the terminal is located;
determining, by the first AMF device, from a plurality of radio access selection priority indexes based on radio access selection priority indexes respectively corresponding to the plurality of first network slices, a radio access selection priority index corresponding to a largest quantity of first network slices or a largest quantity of types of first network slices as a first radio access selection priority index; and
sending, by the first AMF device, a response message when the first AMF device determines that the tracking area supports a first network slice from the plurality of first network slices, wherein the response message comprises the first radio access selection priority index;
wherein the first radio access selection priority index is for selection of an access network device that supports the first network slice at the terminal.

2. The method according to claim 1, wherein, receiving the first request message comprises:
receiving, by the first AMF device, the first request message from a first device; and
sending the response message comprises:
sending, by the first AMF device, the response message to the first device, wherein the first device is a first access network device or a second AMF device.

3. The method according to claim 1, further comprising:
determining, by the first AMF device, that the first AMF device supports the first network slice.

4. The method according to claim 1, wherein, the first AMF device is a default AMF device, and the method further comprises:
determining, by the first AMF device, that the first AMF device does not support the first network slice.

5. The method according to claim 1, further comprising:
selecting, by the first AMF device, the first network slice from the plurality of first network slices, and determining that the first radio access selection priority index corresponds to the first network slice.

6. The method according to claim 5, wherein selecting the first network slice from the plurality of first network slices comprises:
selecting, by the first AMF device, the first network slice from the plurality of first network slices based on priorities of the plurality of first network slices.

7. The method according to claim 5, wherein determining that the first radio access selection priority index corresponds to the first network slice comprises:
using, by the first AMF device, the radio access selection priority index as the first radio access selection priority index; or determining, by the first AMF device, the first radio access selection priority index based on a radio access selection priority index respectively corresponding to each network slice group supported by the tracking area, wherein a first network slice group corresponding to the first radio access selection priority index comprises the first network slice.

8. The method according to claim 7, wherein, an access network device or AMF device supporting the first network slice group corresponding to the first radio access selection priority index supports each network slice in the first network slice group in the tracking area.

9. The method according to claim 1, further comprising:
receiving, by the first AMF device, configuration information comprising an identifier of a network slice supported by the tracking area and a radio access selection priority index respectively corresponding to at least one network slice supported by the tracking area, or, the configuration information comprising an identifier of a network slice group supported by the tracking area and a radio access selection priority index respectively corresponding to at least one network slice group supported by the tracking area.

10. A communication apparatus comprising:
a transceiver configured to receive a first request message, wherein the first request message comprises identifiers of a plurality of first network slices that a terminal requests to access and an identifier of a tracking area in which the terminal is located; and
a processor configured to:
determine, from a plurality of radio access selection priority indexes based on radio access selection priority indexes respectively corresponding to the plurality of first network slices, a radio access selection priority index corresponding to a largest quantity of first network slices or a largest quantity of types of first network slices as a first radio access selection priority index; and
when determining that the tracking area supports a first network slice from the plurality of first network slices, send a response message using the transceiver, wherein the response message comprises the first radio access selection priority index;
wherein the first radio access selection priority index is for selection of an access network device that supports the first network slice at the terminal.

11. The communication apparatus according to claim 10, wherein when receiving the first request message, the transceiver is configured to receive the first request message from a first device; and
when sending the response message, the transceiver is configured to send the response message to the first device;
wherein the first device is a first access network device or a second AMF device.

12. The communication apparatus according to claim 10, wherein, the processor is further configured to determine that the communication apparatus supports the first network slice.

13. The communication apparatus according to claim 10, wherein the communication apparatus is a default AMF device, and the processor is further configured to determine that the communication apparatus does not support the first network slice.

14. The communication apparatus according to claim 10, wherein the processor is further configured to: select the first network slice from the plurality of first network slices, and determine that the first radio access selection priority index corresponds to the first network slice.

15. The communication apparatus according to claim 14, wherein when selecting the first network slice from the plurality of first network slices, the processor is configured to select the first network slice from the plurality of first network slices based on priorities of the plurality of first network slices.

16. The communication apparatus according to claim 14, wherein when determining the first radio access selection priority index corresponding to the one first network slice, the processor is configured to:
use the radio access selection priority index as the first radio access selection priority index, or, determine the first radio access selection priority index based on a radio access selection priority index respectively corresponding to each network slice group supported by the tracking area, wherein a first network slice group corresponding to the first radio access selection priority index comprises the first network slice.

17. The communication apparatus according to claim 16, wherein an access network device or an AMF device supporting the first network slice group corresponding to the first radio access selection priority index supports each network slice in the first network slice group in the tracking area.

18. The communication apparatus according to claim 10, wherein, the transceiver is further configured to receive configuration information comprising, an identifier of a network slice supported by the tracking area and a radio access selection priority index respectively corresponding to at least one network slice supported by the tracking area, or, the configuration information comprising an identifier of a network slice group supported by the tracking area and a radio access selection priority index respectively corresponding to at least one network slice group supported by the tracking area.

19. A communications system comprising:
a first access and mobility management function (AMF) device configured to:
receive a first request message, wherein the first request message comprises identifiers of a plurality of first network slices that a terminal requests to access and an identifier of a tracking area in which the terminal is located;
determine, from a plurality of radio access selection priority indexes based on radio access selection priority indexes respectively corresponding to the plurality of first network slices, a radio access selection priority index corresponding to a largest quantity of first network slices or a largest quantity of types of first network slices as a first radio access selection priority index; and
send a response message when the first AMF device determines that the tracking area supports a first network slice from the plurality of first network slices, wherein the response message comprises the first radio access selection priority index, and the first radio access selection priority index is for selection of an access network device that supports the first network slice at the terminal; and
a first device configured to send the first request message, and receive the response message.

20. The communications system according to claim 19, wherein the first device is a first access network device or a second AMF device.

* * * * *